United States Patent
Monteuuis et al.

(10) Patent No.: US 11,589,236 B2
(45) Date of Patent: Feb. 21, 2023

(54) DETECTING MISBEHAVIOR CONDITIONS IN VEHICLE-TO-EVERYTHING (V2X) MESSAGES

(71) Applicant: QUALCOMM Incorporated, San Diego, CA (US)

(72) Inventors: Jean-Philippe Monteuuis, Northborough, MA (US); Jonathan Petit, Wenham, MA (US); William Whyte, Natick, MA (US); Mohammad Raashid Ansari, Lowell, MA (US); Cong Chen, Shrewsbury, MA (US)

(73) Assignee: QUALCOMM Incorporated, San Diego, CA (US)

(*) Notice: Subject to any disclaimer, the term of this patent is extended or adjusted under 35 U.S.C. 154(b) by 0 days.

(21) Appl. No.: 17/810,391

(22) Filed: Jul. 1, 2022

(65) Prior Publication Data
US 2022/0338012 A1 Oct. 20, 2022

Related U.S. Application Data

(62) Division of application No. 17/213,049, filed on Mar. 25, 2021, now Pat. No. 11,405,786.

(51) Int. Cl.
*H04W 12/121* (2021.01)
*H04W 4/40* (2018.01)
(Continued)

(52) U.S. Cl.
CPC ............ *H04W 12/121* (2021.01); *H04W 4/40* (2018.02); *H04W 12/08* (2013.01); *H04W 12/106* (2021.01)

(58) Field of Classification Search
CPC ... H04W 12/121; H04W 4/40; H04W 12/106; H04W 12/08
See application file for complete search history.

(56) References Cited

U.S. PATENT DOCUMENTS 9,925,940 B1 * 3/2018 Christensen ........... B60Q 5/006
10,869,276 B1 * 12/2020 Lekutai .................. H04W 4/44
(Continued)

FOREIGN PATENT DOCUMENTS

EP 3113529 A1 1/2017
EP 3869841 A1 8/2021
(Continued)

OTHER PUBLICATIONS

ETSI: "Intelligent Transport Systems (ITS),Vehicular Communications, Basic Set of Applications, Part 2: Specification of Cooperative Awareness Basic Service, Draft ETSI EN 302 637-2", ETSI Draft, Draft ETSI EN 302 637-2, European Telecommunications Standards Institute (ETSI), 650, Route Des Lucioles, F-06921 Sophia-Antipolis, France, vol. ITS-ITSWG1, No. V0.0.18, Apr. 11, 2013, pp. 1-42, XP014203681.
(Continued)

*Primary Examiner* — Dung Hong
(74) *Attorney, Agent, or Firm* — The Marbury Law Group, PLLC

(57) ABSTRACT

Embodiments are disclosed that include systems and methods performed by vehicle-to-everything (V2X) system participant to determine whether a misbehavior condition may have occurred based on the generation and/or receipt of a V2X message. The detection of a misbehavior condition may occur if the V2X message is generated and/or received too frequently or not frequently enough. In addition, a misbehavior condition may be detected if the generated and/or received V2X message does include the appropriate security credential.

20 Claims, 17 Drawing Sheets

(51) Int. Cl.
*H04W 12/106* (2021.01)
*H04W 12/08* (2021.01)

(56) References Cited

U.S. PATENT DOCUMENTS

| | | |
|---|---|---|
| 11,405,786 B1 | 8/2022 | Monteuuis |
| 2010/0256836 A1* | 10/2010 | Mudalige ............... G08G 1/164 |
| | | 701/25 |
| 2020/0137580 A1* | 4/2020 | Yang ..................... H04W 12/06 |
| 2021/0064046 A1* | 3/2021 | Singh ................... G06N 3/0454 |
| 2021/0084461 A1 | 3/2021 | Kim et al. |
| 2021/0116913 A1* | 4/2021 | Dingli ................... G05D 1/0276 |
| 2022/0086669 A1* | 3/2022 | Yao ......................... H04L 41/40 |

FOREIGN PATENT DOCUMENTS

| | | | |
|---|---|---|---|
| WO | 2013096254 A1 | 6/2013 | |
| WO | WO-2013096254 A1 * | 6/2013 | ............. G01M 1/22 |
| WO | 2016177481 A1 | 11/2016 | |
| WO | WO-2016177481 A1 * | 11/2016 | ............. G01C 25/00 |
| WO | 2020103524 A1 | 5/2020 | |

OTHER PUBLICATIONS

International Search Report and Written Opinion—PCT/US2022/013805—ISA/EPO—Jul. 1, 2022.

ETSI: "ITS Security Pre-Standardisation Study on Misbehavior Detection", ETSI Draft Specification, 103 460, European Telecommunications Standards institute (ETSI), 650, Route Des Lucioles, F-06921 Sophia-Antipolis, France, vol. WG ITS WG5 Security, No. V0.0.14, May 25, 2020 (May 25, 2020), pp. 1-36, XP014368087, Retrieved from the Internet: URL: docbox.etsi.org/ITS/ITSWG5/70-Draft/WG539/ITS-00539v0014.docx [retrieved on May 25, 2020], paragraphs [0006]-[06.1], paragraphs [0007]-[07.2], figure 2, paragraph [AnnexA].

Fachbereich D., "Misbehavior Detection and Attacker Identification in Vehicular Ad hoc Networks", Darmstadter Dissertation, Nov. 27, 2014 (Nov. 27, 2014), 211 Pages, XP055854234, pp. 7-10, Retrieved from the Internet: URL: https://d-nb.info/111097986X/34 [retrieved on Oct. 24, 2021] paragraphs [02.1]-[02.3], paragraphs [0005]-[5.3.1], paragraph [06.3].

Partial International Search Report—PCT/US2022/013805—ISA/EPO—Apr. 22, 2022.

* cited by examiner

DETECTING MISBEHAVIOR CONDITIONS IN VEHICLE-TO-EVERYTHING (V2X) MESSAGES

RELATED APPLICATIONS

This application is a division of, and claims priority to, pending U.S. Non-Provisional application Ser. No. 17/213,049 filed Mar. 25, 2021 entitled "Detecting Misbehavior Conditions in Vehicle-to-Everything (V2X) Messages," the entire contents of which are hereby incorporated by reference for all purposes.

BACKGROUND

Intelligent Transportation Systems (ITS) aim to provide services relating to different modes of transport and traffic management, enable users to be better informed and make safer, more coordinated and "smarter" use of transport networks. These transport networks include advanced telematics and hybrid communications including Internet Protocol (IP) based communications as well as Ad-Hoc direct communication between vehicles and between vehicles and infrastructure. An evolving Cooperative-ITS (C-ITS) seeks to improve road safety and pave the way towards the realization of full autonomous driving based on the exchange of information via direct wireless short range communications dedicated to C-ITS and Road Transport and Traffic Telematics (RTTT). The key ITS element called vehicle-to-everything (V2X) not only covers vehicle-to-vehicle (V2V) and vehicle-to-infrastructure (V2I), but also includes vehicle-to-pedestrian (V2P) and vehicle-to-network (V2N) communications as well.

Multiple regions of the world are developing standards for vehicle-based communication systems and functionality. For example, standards are being developed in the Institute of Electrical and Electronics Engineers (IEEE) and Society of Automotive Engineers (SAE) for use in North America, or in European Telecommunications Standards Institute (ETSI) and European Committee for Standardization (CEN) for use in Europe. Part of that system is the ability for a vehicle to broadcast Basic Safety Messages (BSM) in North America or Cooperative Awareness Messages (CAM) in Europe, which other vehicles can receive and process to improve traffic safety. The processing of such BSM messages in the transmitting and receiving vehicles occurs in onboard equipment that provide the vehicle-to-everything (V2X) functionality (referred to herein as "V2X onboard equipment").

Although the first ITS were based on narrowband dedicated short-range communications (DSRC), specifications have evolved and now follow 3GPP-defined standards, such as C-V2X and 5G-based cellular communications methods, requiring both technology tests and certification tests. As a result, test workloads and costs are increasing due to increasing numbers of supported communications technologies as well as the need for on-road testing. The cellular vehicle-to-everything (C-V2X) protocol is one such protocol being developed as a foundation for vehicle-based wireless communications that may be used to support intelligent highways, autonomous and semi-autonomous vehicles, and improve the overall efficiency and safety of the highway transportation systems.

The C-V2X protocol defines two transmission modes that, together, provide a 360° non-line-of-sight awareness and a higher level of predictability for enhanced road safety and autonomous driving. A first transmission mode includes direct C-V2X, which includes vehicle-to-vehicle (V2V), vehicle-to-infrastructure (V2I), and vehicle-to-pedestrian (V2P), and that provides enhanced communication range and reliability in the dedicated Intelligent Transportation System (ITS) 5.9 gigahertz (GHz) spectrum that is independent of a cellular network. A second transmission mode includes vehicle-to-network communications (V2N) in mobile broadband systems and technologies, such as third generation wireless mobile communication technologies (3G) (e.g., global system for mobile communications (GSM) evolution (EDGE) systems, code division multiple access (CDMA) 2000 systems, etc.), fourth generation wireless mobile communication technologies (4G) (e.g., long term evolution (LTE) systems, LTE-Advanced systems, mobile Worldwide Interoperability for Microwave Access (mobile WiMAX) systems, etc.), fifth generation wireless mobile communication technologies (5G NR systems, etc.), etc. Other V2X wireless technologies are also under consideration in different regions of the world.

SUMMARY

Various aspects include methods performed by a V2X system participant's processor to detect a misbehavior condition resulting from a generation of a vehicle-to-everything (V2X) message in a V2X system. Various aspects may include retrieving a V2X message profile including a threshold deviation value for sensor data, comparing current sensor data to sensor data contained in a previous vehicle-to-everything (V2X) message to calculate a deviation value for each of the sensor data, determining whether the deviation value for each of the sensor data from the sensor data contained in a previous V2X message exceeds a threshold deviation value contained in the V2X message profile, and generating and transmitting a V2X message including the current sensor data in response to determining that the deviation value for each of the sensor data from the sensor data contained in a previous V2X message does not exceed a threshold deviation value for each of the sensor data.

Some aspects may further include generating and transmitting a misbehavior report to a misbehavior managing authority in response to determining that the deviation value in the sensor data from the sensor data contained in a previous V2X message exceed a threshold deviation value. Some aspects may further include identifying the misbehavior condition in the misbehavior report as a generation violation, and appending the misbehavior report with the V2X message profile or an index of a pre-agreed V2X message profile.

Some aspects may further include applying a security credential to the generated V2X message; determining whether the applied security credential is appropriate for the V2X message; transmitting the V2X message to another V2X system participant in response to determining that the applied security credential is appropriate; and generating and transmitting a misbehavior report in response to determining that the parameters of the applied security credential do not match security credential parameters contained in the V2X message profile.

Some aspects may further include determining a type of the V2X message to be generated, in which retrieving a V2X message profile includes retrieving the V2X message profile based on the determined V2X message type.

Some aspects may further include determining a current geographic area; such that retrieving the V2X message profile may include retrieving the V2X message profile based on the determined current geographic area, in which the security credential parameters contained in the V2X message profile may include: a signature algorithm; signature algorithm parameters; an encryption algorithm; encryption algorithm parameters; a security credential certificate type; a full security credential certificate attach rate; security credential header fields; security credential header checks; and a pseudonym change strategy; and determining that parameters of the applied security credential match security credential parameters contained in the V2X message profile in response to determining that at least one of the security credential parameters of the applied security credential type matches the security credential parameters contained in the V2X message profile.

Some aspects may further include determining a communication technology that V2X system participants are using to transmit and receive V2X messages, in which the threshold deviation values contained in the V2X message profile are based on the determined communication technology.

In some aspects, the V2X message profile may include: a threshold for a maximum frequency of messages; a threshold for a minimum frequency of messages; a deviation in heading threshold; a deviation in position threshold; and a deviation in velocity threshold.

In some aspects, the security credential certificate type may be one of an authentication certificate digest, an authentication full certificate, or an authentication chain.

Some aspects may further include determining whether current sensor spatial data values match threshold spatial data values contained in the V2X message profile such that generating and transmitting the V2X message including the current sensor data in response to determining that the deviation value for each of the sensor data from the sensor data contained in a previous V2X message does not exceed a threshold deviation value for each of the sensor data further includes generating and transmitting the V2X message in response to determining that the current sensor spatial data values match threshold spatial data values contained in the V2X message profile.

Some aspects may further include determining whether current sensor event data values match threshold event data values contained in the V2X message profile such that generating and transmitting the V2X message including the current sensor data in response to determining that the deviation value for each of the sensor data from the sensor data contained in a previous V2X message does not exceed a threshold deviation value for each of the sensor data further includes generating and transmitting the V2X message in response to determining that the current sensor event data values match threshold event data values contained in the V2X message profile.

Various aspects include methods performed by a V2X system detecting a misbehavior condition based on received V2X message. Various aspects may include retrieving a V2X message profile including a threshold deviation value for sensor data, receiving a first V2X message from another V2X system participant, storing a time of receipt of the first V2X message, receiving a second V2X message from the other V2X system participant, determining whether an elapsed time between a time of receipt of the second V2X message and the time of receipt of the first V2X message exceeds a threshold time value contained in the V2X message profile, and transmitting a misbehavior report to a misbehavior managing authority in response to determining that the elapsed time between the time of receipt of the second V2X message and the time of receipt of the first V2X message exceeds the threshold time value contained in the V2X message profile.

Some aspects may further include comparing sensor data contained in each of the first V2X message and the second V2X message to determine whether there has been a deviation in sensor data that exceeds a threshold deviation value contained in the V2X message profile, and transmitting a misbehavior report to the misbehavior managing authority in response to determining that the deviation in the sensor data exceeds a threshold deviation value.

Some aspects may further include identifying the misbehavior condition in the misbehavior report as a reception violation and appending the misbehavior report with a V2X message profile.

Some aspects may further include obtaining an applied security credential included in the first V2X message if present; obtaining an applied security credential included in the second V2X message if present, determining whether parameters of the applied security credential match security credential parameters contained in the V2X message profile, generating and transmitting the misbehavior report in response to determining that the parameters of the applied security credential do not match security credential parameters contained in the V2X message profile.

Some aspects may further include determining a V2X message type of the first and second V2X messages, and retrieving a V2X message profile including the threshold time value based on the determined message type. Some aspects may further include determining a current geographic area, in which the V2X message profile is retrieved based on the determined geographic area and wherein the security credential parameters contained in the V2X message profile may include: a signature algorithm; signature algorithm parameters; an encryption algorithm; encryption algorithm parameters; a security credential certificate type; a full security credential certificate attach rate; security credential header fields; security credential header checks; and a pseudonym change strategy; and determining that parameters of the applied security credential match security credential parameters contained in the V2X message profile in response to determining that at least one of the security credential parameters of the applied security credential type matches the security credential parameters contained in the V2X message profile.

Further aspects may include a V2X system having a processor configured to perform one or more operations of any of the methods summarized above. Further aspects include V2X system having means for performing functions of any of the methods summarized above. Further aspects may include a non-transitory processor-readable storage medium having stored thereon processor-executable instructions configured to cause a V2X system processor to perform operations of any of the methods summarized above.

BRIEF DESCRIPTION OF THE DRAWINGS

The accompanying drawings, which are incorporated herein and constitute part of this specification, illustrate exemplary embodiments of the claims, and together with the general description given above and the detailed description given below, serve to explain the features of the claims.

DETAILED DESCRIPTION

Figure 1A:
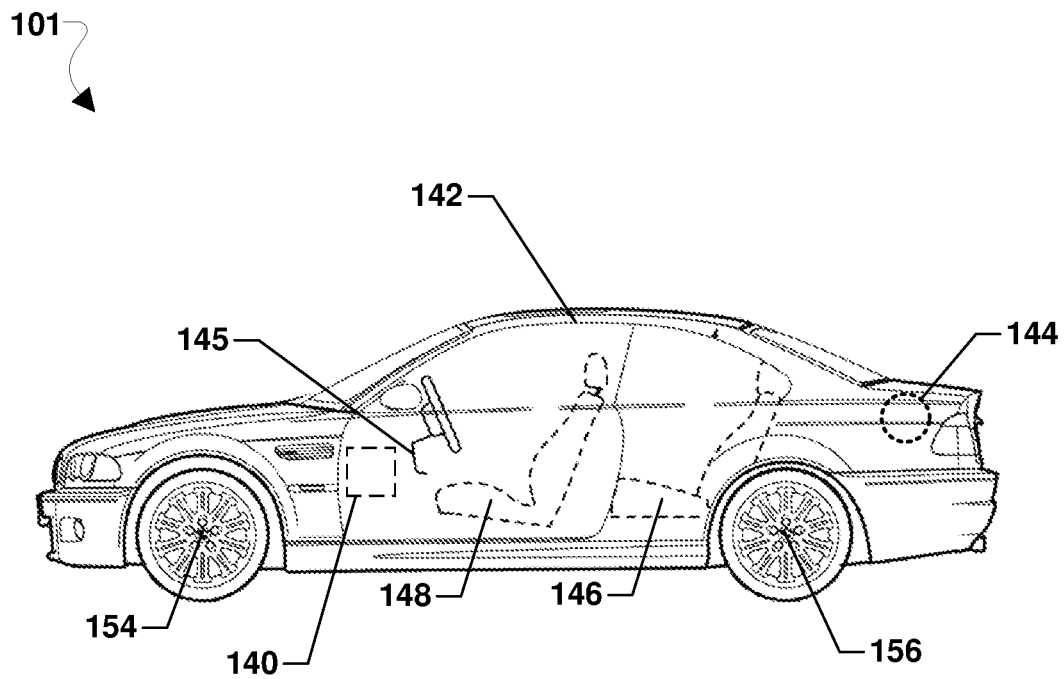
FIGS. 1A and 1B are component block diagrams illustrating a vehicle suitable for implementing various embodiments.

Various embodiments will be described in detail with reference to the accompanying drawings. Wherever possible, the same reference numbers will be used throughout the drawings to refer to the same or like parts. References made to particular examples and implementations are for illustrative purposes, and are not intended to limit the scope of the claims.

Various embodiments include methods and systems of detecting possible misbehavior conditions that may arise due to the inappropriate generation and/or receipt of a V2X message.

The term "mobile device" is used herein to refer to any one or all of wireless router devices, wireless appliances, cellular telephones, smartphones, portable computing devices, personal or mobile multi-media players, laptop computers, tablet computers, smartbooks, ultrabooks, palm-top computers, wireless electronic mail receivers, multimedia Internet-enabled cellular telephones, medical devices and equipment, biometric sensors/devices, wearable devices including smart watches, smart clothing, smart glasses, smart wrist bands, smart jewelry (e.g., smart rings, smart bracelets, etc.), entertainment devices (e.g., wireless gaming controllers, music and video players, satellite radios, etc.), wireless-network enabled Internet of Things (IoT) devices including smart meters/sensors, industrial manufacturing equipment, large and small machinery and appliances for home or enterprise use, wireless communication elements within autonomous and semiautonomous vehicles, mobile devices affixed to or incorporated into various mobile platforms, global positioning system devices, and similar electronic devices that include a memory, wireless communication components and a programmable processor.

The term "system on chip" (SOC) is used herein to refer to a single integrated circuit (IC) chip that contains multiple resources and/or processors integrated on a single substrate. A single SOC may contain circuitry for digital, analog, mixed-signal, and radio-frequency functions. A single SOC may also include any number of general purpose and/or specialized processors (digital signal processors, modem processors, video processors, etc.), memory blocks (e.g., ROM, RAM, Flash, etc.), and resources (e.g., timers, voltage regulators, oscillators, etc.). SOCs may also include software for controlling the integrated resources and processors, as well as for controlling peripheral devices.

The term "system in a package" (SIP) may be used herein to refer to a single module or package that contains multiple resources, computational units, cores and/or processors on two or more IC chips, substrates, or SOCs. For example, a SIP may include a single substrate on which multiple IC chips or semiconductor dies are stacked in a vertical configuration. Similarly, the SIP may include one or more multi-chip modules (MCMs) on which multiple ICs or semiconductor dies are packaged into a unifying substrate. A SIP may also include multiple independent SOCs coupled together via high speed communication circuitry and packaged in close proximity, such as on a single motherboard or in a single mobile device. The proximity of the SOCs facilitates high speed communications and the sharing of memory and resources.

As used in this application, the terms "component," "system," "unit," "module," and the like include a computer-related entity, such as, but not limited to, hardware, firmware, a combination of hardware and software, software, or software in execution, which are configured to perform particular operations or functions. For example, a component may be, but is not limited to, a process running on a processor, a processor, an object, an executable, a thread of execution, a program, and/or a computer. By way of illustration, both an application running on a communication device and the communication device may be referred to as a component. One or more components may reside within a process and/or thread of execution and a component may be localized on one processor or core and/or distributed between two or more processors or cores. In addition, these components may execute from various non-transitory computer readable media having various instructions and/or data structures stored thereon. Components may communicate by way of local and/or remote processes, function or procedure calls, electronic signals, data packets, memory read/writes, and other known computer, processor, and/or process related communication methodologies.

V2X systems and technologies hold great promise for improving traffic flows and vehicle safety by enabling vehicles to share information regarding their location, speed, direction of travel, braking, and other factors that may be useful to other vehicles for anti-collision and other safety functions. Vehicles equipped with V2X/V2V onboard equipment will frequently (e.g. up to 20 times per second) transmit their vehicle information in packets referred to as Basic Safety Messages (BSM) or Cooperative Awareness Message (CAM). With all V2X equipped vehicles transmitting such BSM/CAM messages, all receiving vehicles have the information required to control their own speed and direction to avoid collisions and efficiently and safely position vehicles with respect to each other. It is envisioned that V2X equipped vehicles may be able to improve traffic flow by safely reducing separation distances, platooning several vehicles together, and avoiding vehicles experiencing breakdowns.

For ease of reference, some of the embodiments are described in this application as being performed by a V2X system participant operating within V2X terminologies. However, it should be understood that various embodiments encompass any or all of the V2X/V2V or vehicle-based communication standards, messages or technologies. As such, nothing in the application should be construed to limit the claims to V2X/V2V systems unless expressly recited as such in the claims. In addition, the embodiments described herein discuss onboard equipment to perform V2X/V2V communication. In V2X/V2V systems, system participant equipment may include, but is not limited to, vehicle onboard equipment, mobile devices, and roadside units (RSU). RSUs may include stationary devices such as traffic signals, roadside beacons, traffic cameras, etc. Each of system participant equipment may broadcast information to other system participant equipment. For example, a vehicle may contain on-board/in-dash equipment and sensors that report on vehicle conditions (e.g., location, orientation, speed, dimensions, etc.). A mobile device carried by a pedestrian or vehicle rider (e.g., motorcycle, car, bicycle rider) may contain sensors that report on pedestrian conditions (e.g., location, orientation, speed, dimensions, etc.). Each of the vehicle, pedestrian and RSU may be a V2X system participant. The processor contained in the in-dash/onboard unit or mobile device may be considered the V2X system participant processor. The V2X communication among V2X system participant equipment may allow applications executing on each V2X system participant equipment to provide vehicles and pedestrians with safety applications (e.g., applications that may determine imminent hazards such as a vehicle hard-braking or speeding out of a blind cross-street) or mobility (planning for traffic signal changes), or provide other useful functions within the vehicular transportation system as a whole. For ease of reference, Various embodiments described below discuss vehicles (e.g., car). Such discussion is not intended to limit any of the embodiments for use with vehicles. Rather the embodiments described herein may be used by any V2X system participant to detect misbehavior conditions arising from the generation and/or receipt of V2X messages that are inconsistent with message characteristics defined by the communication standards. Such communication standards may be geographically and/or time dependent. Put another way the message characteristics may vary from place to place and time to time.

Intelligent Transportation Systems (ITS) aim to provide services relating to different modes of transport and traffic management, enable users to be better informed and make safer, more coordinated and "smarter" use of transport networks. Consistency and predictability are foundations for such safe transport systems. For example, by knowing the individual destinations of the vehicles operating in the ITS, traffic may be optimized. The number and timing of vehicles travelling on particular routes may be manipulated so that routes are not overwhelmed, overcrowded and subject to traffic jams. Moreover, by knowing the operating conditions of each vehicle participating in the ITS, the unpredictability of breakdowns and/or unsafe vehicle operating conditions may be avoided. For example, operators of the vehicle that is operating unsafely may be warned to change the operation. In addition, potential breakdown and malfunctioning equipment (e.g., failed braking system) may be avoided by informing the operator to repair the vehicle in advance or at a minimum by informing operators of neighboring vehicles to avoid the vehicle that may breakdown or operate in an unsafe manner.

In order to facilitate this consistency and predictability, an ITS depend on reliable communications between the various participants of the ITS. These communications may be V2X messages exchanged between system participants. Such V2X communications may include the exchange of BSM/CAM between participating ITS entities that create and maintain awareness of each other and support cooperative performance of vehicles using the road network. A BSM/CAM contains status and attribute information of the originating system participant. The content varies depending on the type of the system participant. For vehicle system participants, the status information includes time, position, motion state, activated systems, etc. and the attribute information includes data about the dimensions, vehicle type and role in the road traffic, etc. On reception of a BSM/CAM the receiving system participant becomes aware of the presence, type, and status of the originating system participant. The received information can be used by the receiving system participant to support several ITS applications. For example, by comparing the status of the originating system participant with its own status, a receiving system participant is able to estimate the collision risk with the originating system participant and, if necessary, inform the driver of the vehicle via the human machine interface (HMI).

BSM/CAM may contain information about vehicle position, heading, speed, and other information relating to a vehicle's state and predicted path. Other ITS messages may include single phase and timing (SPAT), decentralized environmental notification message (DENM), collective perception message (CPM), map data (MAP) and others. Each of these messages may be collectively referred to as V2X messages.

Misbehavior reporting is a key part of the security system for V2X communications. In misbehavior reporting, field devices—vehicles or roadside units (RSUs)—observe V2X messages, detect when the contents of those V2X messages are not consistent with the totality of V2X system participant sensor and observation data, and generate a misbehavior report (MBR) that can be sent to a Misbehavior Managing Authority. In instances in which the V2X message is not consistent with the totality of vehicle sensor and observation data a misbehavior condition may be detected and a MBR may be generated. The Misbehavior Managing Authority may aggregate MBRs received from different reporting V2X system participants from across the Misbehavior Managing Authority's region of responsibility and determine possible responses to the MBRs. There may be a wide range of potential responses, including among others: determining that the MBRs are not actually reporting valid misbehavior conditions; determining that the reported MBRs are actual misbehavior conditions but are causing so little disruption that it would cost more to fix the problem or condition than to let it continue; determining that a reporting V2X participant has bad software and needs to be updated; and determining that the signing keys associated with a V2X participant have been extracted from the V2X system participant and are being used to mount a nationwide attack of bad messages, and so the device keys need to be revoked so that no-one trusts them further.

In most conventional V2X systems, a misbehavior detection system (MBDS) is concerned with the accuracy and consistency of the data contained within the V2X messages. Misbehavior conditions may be detected when a detection system determines that the data contained in a V2X message is inconsistent with other collected data. The MBDS may detect misbehaviors by using a set of algorithms relying solely on V2X data. Each of the V2X messages may be subject to analysis for a misbehavior condition. For example, a V2X message may include sensor data that supports its intended messages (e.g., destination, operational data, etc.). An analysis of this data may give rise to the detection of a misbehavior condition if any of the sensor data is outside normal operation parameters. For example, the temperature of an engine registers 1000 degrees Celsius or the speed of the vehicle is 1000 miles per hour. Data that is clearly outside the normal operating parameters may indicate that the sensor is malfunctioning, or the vehicle is operating in a manner that is not intended. Knowledge of such misbehavior conditions may be beneficial as the vehicle operator may be informed to take corrective measures to ensure safe operation of the vehicle. For example, sensors may be replaced or repaired, new software may be installed, etc.

In some circumstances, a malicious actor may also attempt to corrupt an ITS by hacking the communication or sensor systems of a vehicle and introduce inaccurate or false data into the system. For example, a malicious actor may report a false destination or sensor speed to cause corruption of the ITS. Thus, most misbehavior detection systems are focused on the data contained in the V2X message to determine whether a misbehavior condition has occurred.

In overview, various embodiments include methods and systems of detecting a possible misbehavior condition that may arise due to the inappropriate generation and/or receipt of a V2X message. While the sensor data contained within the V2X message may be the focus of most misbehavior condition detection systems, in some instances the generation or receipt of the V2X message itself may indicate a misbehavior condition. As noted above, consistency and predictability are foundations for such safe transport systems. Such consistency and predictability may extend to the timing of when a V2X message is to be generated and received. To accommodate communications for a large number of participants within the limited communication resources of an ITS, various V2X system may set operational thresholds with respect to the number, size and frequency of message a V2X system participant may send. The generation and/or receipt of V2X messages outside of these operational thresholds may indicate a misbehavior condition.

As an example on the sender side, a V2X system participant on-board unit (OBU) may generate (or not at all) V2X messages without following the requirements related to message generation. The cause of this issue can be a faulty code specification or the injection of malicious codes or program altering/forcing/preventing the message generation. Such high frequency message generation may cause the sender side OBU to focus on message generation and divert resources from other functions.

As an example on the receiver side, the V2X system participant OBU that receives the V2X messages at a higher than normal frequency rate may process V2X messages sent from a misbehaving V2X system participant. Current misbehavior detection systems will classify the content of each message (and so the whole communication) as normal. Conventionally, despite the high frequency of generated and/or received V2X messages, so long as the contents of the V2X message is consistent with the totality of vehicle sensor and observation data, there may be no reason to generate a misbehavior condition report. Thus, current misbehavior detection systems will not report the malicious sender generating V2X message at an abnormal rate.

As another example, a sender may improperly generate V2X messages at a lower frequency rate than is defined in a standard. As a result of the delay in message generation, the anticipated changes in heading, position and/or velocity may exceed a threshold value. Such a large deviation in any of these values may cause a misbehavior detection system to improperly identify a misbehavior condition, because such large deviations may indicate inconsistent vehicle operation.

As another example, the inclusion of inappropriate security credentials may result in V2X messages of exceedingly large sizes. The increase in message size may cause communication traffic congestion. Thus, in a manner similar to the high frequency message generation, generating messages of unexpectedly large sizes may also corrupt the efficiency and reliability of the ITS. In an ITS, the data contained in the V2X messages should be accurate, but also the generation and characteristics of the messages themselves should be consistent with characteristics defined in the communications standards in order to ensure steady operation. Deviations for the message characteristics defined in the communications standards may indicate a misbehavior condition in addition to inaccuracies in the data contained in the messages. Thus, various embodiments include methods that detect misbehavior conditions based on characteristics of the V2X message itself and not necessarily based on the data contained therein.

Figure 1B:
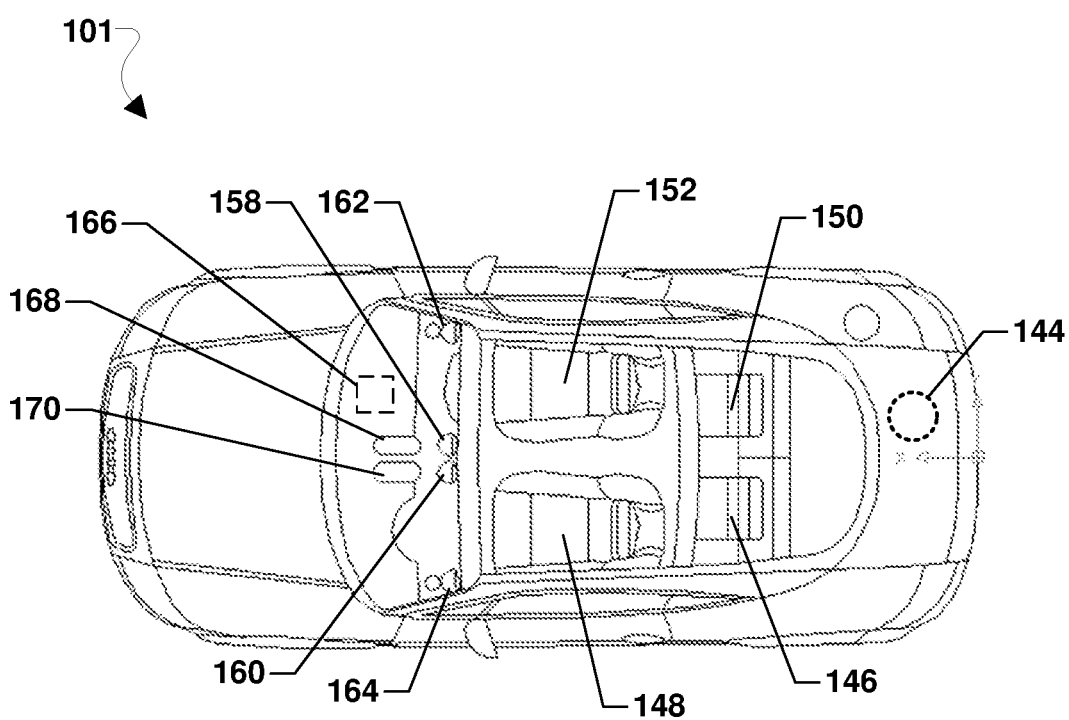

Various embodiments may be implemented within a variety of V2X system participants, an example vehicle 101 of which is illustrated in FIGS. 1A and 1B. With reference to FIGS. 1A and 1B, a vehicle 101 may include a control unit 140 and a plurality of sensors 144-170, including satellite geopositioning system receivers 142, occupancy sensors 144, 146, 148, 150, 152, tire pressure sensors 154, 156, cameras 158, 160, microphones 162, 164, impact sensors 166, radar 168, and lidar 170. The plurality of sensors 144-170, disposed in or on the vehicle, may be used for various purposes, such as autonomous and semi-autonomous navigation and control, crash avoidance, position determination, etc., as well to provide sensor data regarding objects and people in or on the vehicle 101. The sensors 144-170 may include one or more of a wide variety of sensors capable of detecting a variety of information useful for navigation and collision avoidance. Each of the sensors 144-170 may be in wired or wireless communication with a control unit 140, as well as with each other. In particular, the sensors may include one or more cameras 158, 160 or other optical sensors or photo optic sensors. The sensors may further include other types of object detection and ranging sensors, such as radar 168, lidar 170, IR sensors, and ultrasonic sensors. The sensors may further include tire pressure sensors 154, 156, humidity sensors, temperature sensors, satellite geopositioning sensors 142, control input sensors 145, accelerometers, vibration sensors, gyroscopes, gravimeters, impact sensors 166, force meters, stress meters, strain sensors, fluid sensors, chemical sensors, gas content analyzers, pH sensors, radiation sensors, Geiger counters, neutron detectors, biological material sensors, microphones 162, 164, occupancy sensors 144, 146, 148, 150, 152, proximity sensors, and other sensors.

The vehicle control unit 140 may be configured with processor-executable instructions to perform navigation and collision avoidance operations using information received from various sensors, particularly the cameras 158, 160. In some embodiments, the control unit 140 may supplement the processing of camera images using distance and relative position (e.g., relative bearing angle) that may be obtained from radar 168 and/or lidar 170 sensors. The control unit 140 may further be configured to control steering, breaking and speed of the vehicle 101 when operating in an autonomous or semi-autonomous mode using information regarding other vehicles determined using various embodiments.

Figure 1C:
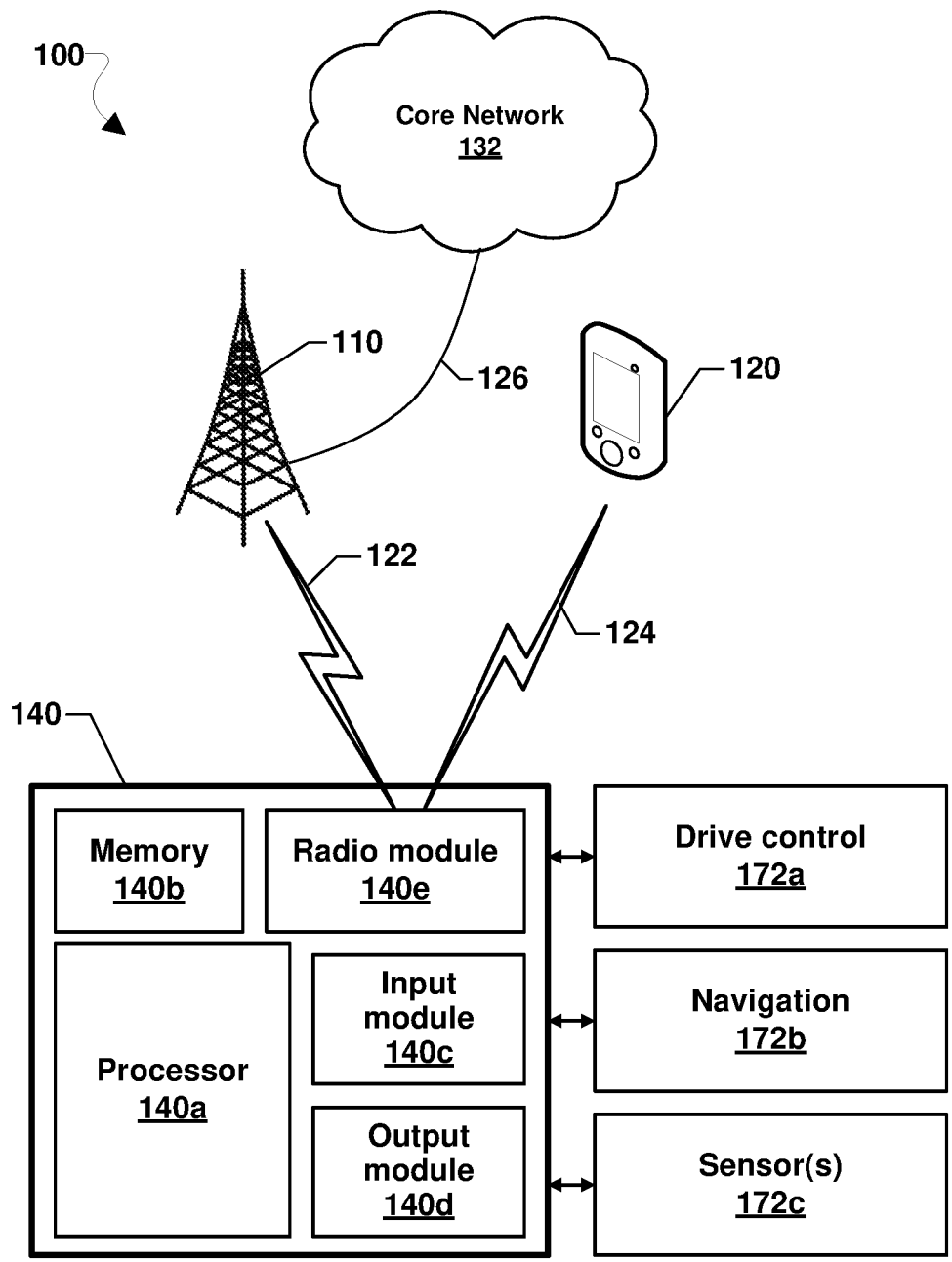
FIG. 1C is a component block diagram illustrating components of a vehicle suitable for implementing various embodiments.

FIG. 1C is a component block diagram illustrating a communication system 100 of components and support systems suitable for implementing various embodiments. With reference to FIGS. 1A-1C, a vehicle 101 may include a control unit 140, which may include various circuits and devices used to control the operation of the vehicle 101. In the example illustrated in FIG. 1D the control unit 140 includes a processor 140*a*, memory 140*b*, an input module 140*c*, an output module 140*d* and a radio module 140*e*. The control unit 140 may be coupled to and configured to control drive control components 172*a*, navigation components 172*b*, and one or more sensors 172*c* of the vehicle 101. The processor 140*a* that may be configured with processor-executable instructions to control maneuvering, navigation, and/or other operations of the vehicle 101, including operations of various embodiments. The processor 140*a* may be coupled to the memory 140*b*.

The radio module 140*e* may be configured for wireless communication. The radio module 140*e* may exchange signals (e.g., command signals for controlling maneuvering, signals from navigation facilities, etc.) via the communication link 122 with a network transceiver (e.g., the base station 110), and may provide the signals to the processor 140*a* and/or the navigation unit 172*b*. In some embodiments, the radio module 140*e* may enable the vehicle 101 to communicate with a wireless communication device 120 through the wireless communication link 124. The wireless communication link 124 may be a bidirectional or unidirectional communication link, and may use one or more communication protocols, as described.

The input module 140*c* may receive sensor data from one or more vehicle sensors 172*c* as well as electronic signals from other components, including the drive control components 172*a* and the navigation components 172*b*. The output module 140*d* may communicate with or activate various components of the vehicle 101, including the drive control components 172*a*, the navigation components 172*b*, and the sensor(s) 172*c*.

The control unit 140 may be coupled to the drive control components 172*a* to control physical elements of the vehicle 101 related to maneuvering and navigation of the vehicle, such as the engine, motors, throttles, steering elements, flight control elements, braking or deceleration elements, and the like. The drive control components 172*a* may also include components that control other devices of the vehicle, including environmental controls (e.g., air conditioning and heating), external and/or interior lighting, interior and/or exterior informational displays (which may include a display screen or other devices to display information), safety devices (e.g., haptic devices, audible alarms, etc.), and other similar devices.

The control unit 140 may be coupled to the navigation components 172*b*, and may receive data from the navigation components 172*b* and be configured to use such data to determine the present position and orientation of the vehicle 101, as well as an appropriate course toward a destination. The navigation components 172*b* may include or be coupled to a global navigation satellite system (GNSS) receiver system (e.g., one or more Global Positioning System (GPS) receivers) enabling the vehicle 101 to determine its current position using GNSS signals. Alternatively, or in addition, the navigation components 172*b* may include radio navigation receivers for receiving navigation beacons or other signals from radio nodes, such as Wi-Fi access points, cellular network sites, radio station, remote computing devices, other vehicles, etc. Through control of the drive control elements 172*a*, the processor 140*a* may control the vehicle 101 to navigate and maneuver. The processor 140*a* and/or the navigation components 172*b* may be configured to communicate with a network element such as a server in a communication network (e.g., the core network 132) via the wireless communication link 122, 126 to receive commands to control maneuvering, receive data useful in navigation, provide real-time position reports, and assess other data.

The control unit 140 may be coupled to one or more sensors 172*c*. The sensor(s) 172*c* may include the sensors 144-170 as described, and may the configured to provide a variety of data to the processor 140*a*.

While the control unit 140 is described as including separate components, in some embodiments some or all of the components (e.g., the processor 140*a*, the memory 140*b*, the input module 140*c*, the output module 140*d*, and the radio module 140*e*) may be integrated in a single device or module, such as a system-on-chip (SOC) processing device. Such an SOC processing device may be configured for use in vehicles and be configured, such as with processor-executable instructions executing in the processor 140*a*, to perform operations of navigation and collision avoidance using local dynamic map (LDM) data when installed in a vehicle.

Figure 1D:
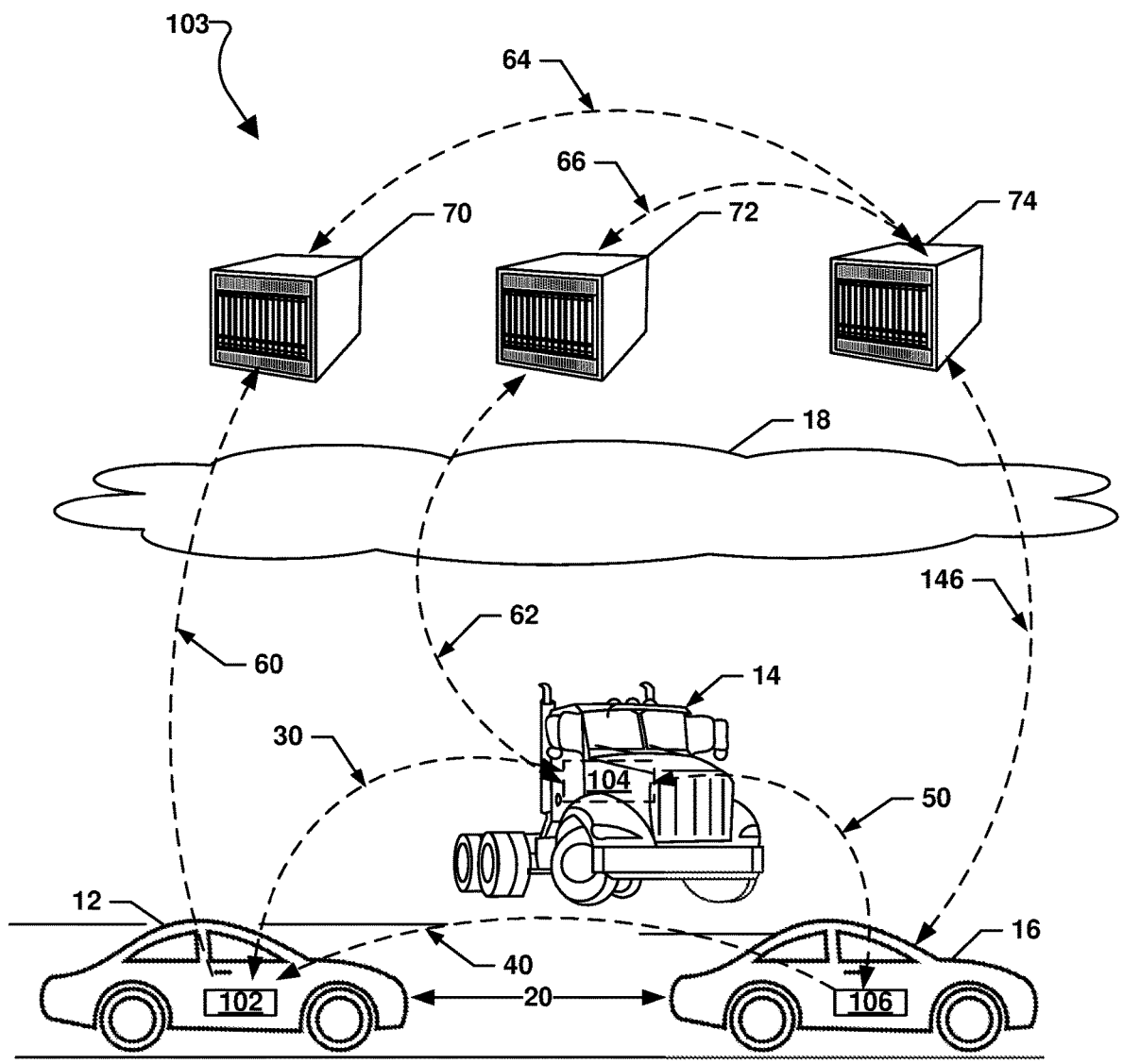
FIG. 1D is a schematic block diagram illustrating a subset of a V2X communication system suitable for implementing various embodiments.

FIG. 1D illustrates a portion of the V2X system 103 including three vehicles, 12, 14, 16. In the illustrated example, each vehicle 12, 14, 16 includes V2X onboard equipment 102, 104, 106, respectively, that are configured to periodically broadcast Basic Safety Messages 30, 40, 50 for receipt and processing by other vehicles' onboard equipment (e.g., 102, 104, 106). By sharing the vehicle location, speed, direction, braking, and other information, vehicles can maintain safe separation and identify and avoid potential collisions. For example, a trailing vehicle 12 receiving Basic Safety Messages 40 from a leading vehicle 16 can determine the speed and location of the vehicle 16, which in turn enables vehicle 12 to match the speed and maintain a safe separation distance 20. By being informed through Basic Safety Messages 40 when the leading vehicles 16 applies the brakes, the V2X equipment 102 in the trailing vehicle 12 can apply brakes simultaneously to maintain the safe separation distance 20 even when the leading vehicle 16 stops suddenly. As another example, the V2X equipment 104 within the truck vehicle 14 may receive Basic Safety Messages 30, 50 from the two vehicles 12, 16, and thus be informed that the truck vehicle 14 should stop at the intersection to avoid a collision. Each of the vehicle V2X on-board equipment 102, 104, 106 may communicate with one another using any of a variety close proximity communication protocols. In addition, the vehicles may be able to transmit data and information regarding detected Basic Safety Messages as well as detected misbehavior reports to an original equipment manufacturer (OEM) (70, 72) and/or remote misbehavior managing authority 74 via communication links 60, 62 through a communication network 18 (e.g., cellular, WiFi, etc.) The MBR may be transmitted directly to the misbehavior managing authority 74 (e.g., through communication link 64, 66). In other embodiments, the MBR may first be transmitted to a MBR pre-processing unit such as the OEM servers 70, 72 for pre-processing through communication links 64, 66. Then the pre-processed MBR may be transmitted from the MBR pre-processing servers 70, 72 to the misbehavior managing authority 74 through communication links 64, 66. In other embodiments, a MBR may be received from a vehicle, such as from vehicle 16, at the remote misbehavior managing authority 74. The remote misbehavior managing authority 74 may relay the received MBR from the vehicle 16 onto OEM servers 70, 72 via communication links 64, 66. In addition, the OEM servers 70, 72 may provide confirmation reports to the remote misbehavior managing authority 74 via communication links 64, 66.

Figure 2A:
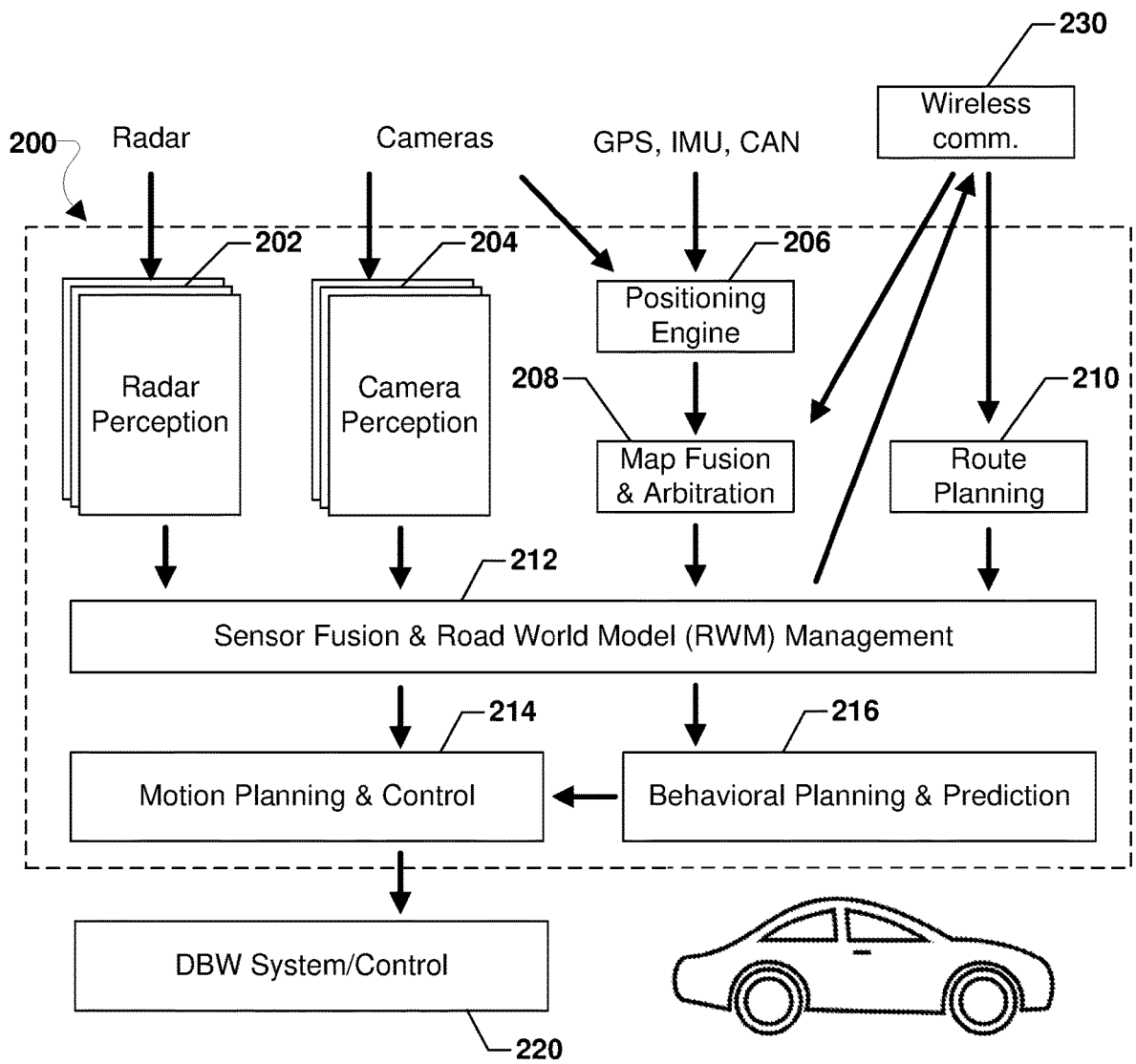
FIG. 2A is a component block diagram illustrating components of an example V2X system participant management system according to various embodiments.

FIG. 2A is a component block diagram illustrating components of an example misbehavior management system 200. The vehicle management system 200 may include various subsystems, communication elements, computational elements, computing devices or units which may be utilized within a vehicle 101. With reference to FIGS. 1A-2A, the various computational elements, computing devices or units within misbehavior management system 200 may be implemented within a system of interconnected computing devices (i.e., subsystems), that communicate data and commands to each other (e.g., indicated by the arrows in FIG. 2A). In some implementations, the various computational elements, computing devices or units within misbehavior management system 200 may be implemented within a single computing device, such as separate threads, processes, algorithms or computational elements. Therefore, each subsystem/computational element illustrated in FIG. 2A is also generally referred to herein as "layer" within a computational "stack" that constitutes the misbehavior management system 200. However, the use of the terms layer and stack in describing various embodiments are not intended to imply or require that the corresponding functionality is implemented within a single autonomous (or semi-autonomous) vehicle management system computing device, although that is a potential implementation embodiment. Rather the use of the term "layer" is intended to encompass subsystems with independent processors, computational elements (e.g., threads, algorithms, subroutines, etc.) running in one or more computing devices, and combinations of subsystems and computational elements.

The misbehavior management system stack may include a radar perception layer 202, a camera perception layer 204, a positioning engine layer 206, a map fusion and arbitration layer 208, a route planning layer 210, sensor fusion and road world model (RWM) management layer 212, motion planning and control layer 214, and behavioral planning and prediction layer 216. The layers 202-216 are merely examples of some layers in one example configuration of the misbehavior management system stack 200. In other configurations, other layers may be included, such as additional layers for other perception sensors (e.g., LIDAR perception layer, etc.), additional layers for planning and/or control, additional layers for modeling, etc., and/or certain of the layers 202-216 may be excluded from the misbehavior management system stack 200. Each of the layers 202-216 may exchange data, computational results and commands as illustrated by the arrows in FIG. 2A. Further, the misbehavior management system stack 200 may receive and process data from sensors (e.g., radar, lidar, cameras, inertial measurement units (IMU) etc.), navigation systems (e.g., GPS receivers, IMUs, etc.), vehicle networks (e.g., Controller Area Network (CAN) bus), and databases in memory (e.g., digital map data). The misbehavior management system stack 200 may output vehicle control commands or signals to the drive by wire (DBW) system/control unit 220, which is a system, subsystem or computing device that interfaces directly with vehicle steering, throttle and brake controls. The configuration of the misbehavior management system stack 200 and DBW system/control unit 220 illustrated in FIG. 2A is merely an example configuration and other configurations of a vehicle management system and other vehicle components may be used. As an example, the configuration of the misbehavior management system stack 200 and DBW system/control unit 220 illustrated in FIG. 2A may be used in a vehicle configured for autonomous or semi-autonomous operation while a different configuration may be used in a non-autonomous vehicle.

The radar perception layer 202 may receive data from one or more detection and ranging sensors, such as radar (e.g., 132) and/or lidar (e.g., 138), and process the data to recognize and determine locations of other vehicles and objects within a vicinity of the vehicle 100. The radar perception layer 202 may include use of neural network processing and artificial intelligence methods to recognize objects and vehicles, and pass such information on to the sensor fusion and RWM management layer 212.

The camera perception layer 204 may receive data from one or more cameras, such as cameras (e.g., 158, 160), and process the data to recognize and determine locations of other vehicles and objects within a vicinity of the vehicle 100. The camera perception layer 204 may include use of neural network processing and artificial intelligence methods to recognize objects and vehicles, and pass such information on to the sensor fusion and RWM management layer 212.

The positioning engine layer 206 may receive data from various sensors and process the data to determine a position of the vehicle 100. The various sensors may include, but is not limited to, GPS sensor, an IMU, and/or other sensors connected via a CAN bus. The positioning engine layer 206 may also utilize inputs from one or more cameras, such as cameras (e.g., 158, 160) and/or any other available sensor, such as radars, LIDARs, etc.

The misbehavior management system 200 may include or be coupled to a vehicle wireless communication subsystem 230. The wireless communication subsystem 230 may be configured to communicate with other vehicle computing devices and highway communication systems, such as via vehicle-to-vehicle (V2V) communication links and/or to remote information sources, such as cloud-based resources, via cellular wireless communication systems, such as 5G networks. In various embodiments, the wireless communication subsystem 230 may communicate with other V2X system participants via wireless communication links to receive V2X messages as well as sensor data that may support a conclusion that a misbehavior condition is detected.

The map fusion and arbitration layer 208 may access sensor data received from other V2X system participants and receive output received from the positioning engine layer 206 and process the data to further determine the position of the vehicle 101 within the map, such as location within a lane of traffic, position within a street map, etc. sensor data may be stored in a memory (e.g., memory 312). For example, the map fusion and arbitration layer 208 may convert latitude and longitude information from GPS into locations within a surface map of roads contained in the sensor data. GPS position fixes include errors, so the map fusion and arbitration layer 208 may function to determine a best guess location of the vehicle within a roadway based upon an arbitration between the GPS coordinates and the sensor data. For example, while GPS coordinates may place the vehicle near the middle of a two-lane road in the sensor data, the map fusion and arbitration layer 208 may determine from the direction of travel that the vehicle is most likely aligned with the travel lane consistent with the direction of travel. The map fusion and arbitration layer 208 may pass map-based location information to the sensor fusion and RWM management layer 212.

The route planning layer 210 may utilize sensor data, as well as inputs from an operator or dispatcher to plan a route to be followed by the vehicle 101 to a particular destination. The route planning layer 210 may pass map-based location information to the sensor fusion and RWM management layer 212. However, the use of a prior map by other layers, such as the sensor fusion and RWM management layer 212, etc., is not required. For example, other stacks may operate and/or control the vehicle based on perceptual data alone without a provided map, constructing lanes, boundaries, and the notion of a local map as perceptual data is received.

The sensor fusion and RWM management layer 212 may receive data and outputs produced by the radar perception layer 202, camera perception layer 204, map fusion and arbitration layer 208, and route planning layer 210, and use some or all of such inputs to estimate or refine the location and state of the vehicle 101 in relation to the road, other vehicles on the road, and other objects within a vicinity of the vehicle 100. For example, the sensor fusion and RWM management layer 212 may combine imagery data from the camera perception layer 204 with arbitrated map location information from the map fusion and arbitration layer 208 to refine the determined position of the vehicle within a lane of traffic. As another example, the sensor fusion and RWM management layer 212 may combine object recognition and imagery data from the camera perception layer 204 with object detection and ranging data from the radar perception layer 202 to determine and refine the relative position of other vehicles and objects in the vicinity of the vehicle. As another example, the sensor fusion and RWM management layer 212 may receive information from vehicle-to-vehicle (V2V) communications (such as via the CAN bus) regarding other vehicle positions and directions of travel, and combine that information with information from the radar perception layer 202 and the camera perception layer 204 to refine the locations and motions of other vehicles. The sensor fusion and RWM management layer 212 may output refined location and state information of the vehicle 100, as well as refined location and state information of other vehicles and objects in the vicinity of the vehicle, to the motion planning and control layer 214 and/or the behavior planning and prediction layer 216.

As a further example, the sensor fusion and RWM management layer 212 may use dynamic traffic control instructions directing the vehicle 101 to change speed, lane, direction of travel, or other navigational element(s), and combine that information with other received information to determine refined location and state information. The sensor fusion and RWM management layer 212 may output the refined location and state information of the vehicle 101, as well as refined location and state information of other vehicles and objects in the vicinity of the vehicle 100, to the motion planning and control layer 214, the behavior planning and prediction layer 216 and/or devices remote from the vehicle 101, such as a data server, other vehicles, etc., via wireless communications, such as through C-V2X connections, other wireless connections, etc.

As a still further example, the sensor fusion and RWM management layer 212 may monitor perception data from various sensors, such as perception data from a radar perception layer 202, camera perception layer 204, other perception layer, etc., and/or data from one or more sensors themselves to analyze conditions in the vehicle sensor data. The sensor fusion and RWM management layer 212 may be configured to detect conditions in the sensor data, such as sensor measurements being at, above, or below a threshold, certain types of sensor measurements occurring, etc., and may output the sensor data as part of the refined location and state information of the vehicle 101 provided to the behavior planning and prediction layer 216 and/or devices remote from the vehicle 100, such as a data server, other vehicles, etc., via wireless communications, such as through C-V2X connections, other wireless connections, etc.

The refined location and state information may include vehicle descriptors associated with the vehicle and the vehicle owner and/or operator, such as: vehicle specifications (e.g., size, weight, color, on board sensor types, etc.); vehicle position, speed, acceleration, direction of travel, attitude, orientation, destination, fuel/power level(s), and other state information; vehicle emergency status (e.g., is the vehicle an emergency vehicle or private individual in an emergency); vehicle restrictions (e.g., heavy/wide load, turning restrictions, high occupancy vehicle (HOV) authorization, etc.); capabilities (e.g., all-wheel drive, four-wheel drive, snow tires, chains, connection types supported, on board sensor operating statuses, on board sensor resolution levels, etc.) of the vehicle; equipment problems (e.g., low tire pressure, weak breaks, sensor outages, etc.); owner/operator travel preferences (e.g., preferred lane, roads, routes, and/or destinations, preference to avoid tolls or highways, preference for the fastest route, etc.); permissions to provide sensor data to a data agency server (e.g., 184); and/or owner/operator identification information.

The behavioral planning and prediction layer 216 of the autonomous vehicle system stack 200 may use the refined location and state information of the vehicle 101 and location and state information of other vehicles and objects output from the sensor fusion and RWM management layer 212 to predict future behaviors of other vehicles and/or objects. For example, the behavioral planning and prediction layer 216 may use such information to predict future relative positions of other vehicles in the vicinity of the vehicle based on own vehicle position and velocity and other vehicle positions and velocity. Such predictions may take into account information from the LDM data and route planning to anticipate changes in relative vehicle positions as host and other vehicles follow the roadway. The behavioral planning and prediction layer 216 may output other vehicle and object behavior and location predictions to the motion planning and control layer 214. Additionally, the behavior planning and prediction layer 216 may use object behavior in combination with location predictions to plan and generate control signals for controlling the motion of the vehicle 101. For example, based on route planning information, refined location in the roadway information, and relative locations and motions of other vehicles, the behavior planning and prediction layer 216 may determine that the vehicle 101 needs to change lanes and accelerate, such as to maintain or achieve minimum spacing from other vehicles, and/or prepare for a turn or exit. As a result, the behavior planning and prediction layer 216 may calculate or otherwise determine a steering angle for the wheels and a change to the throttle setting to be commanded to the motion planning and control layer 214 and DBW system/control unit 220 along with such various parameters necessary to effectuate such a lane change and acceleration. One such parameter may be a computed steering wheel command angle.

The motion planning and control layer 214 may receive data and information outputs from the sensor fusion and RWM management layer 212 and other vehicle and object behavior as well as location predictions from the behavior planning and prediction layer 216, and use this information to plan and generate control signals for controlling the motion of the vehicle 101 and to verify that such control signals meet safety requirements for the vehicle 100. For example, based on route planning information, refined location in the roadway information, and relative locations and motions of other vehicles, the motion planning and control layer 214 may verify and pass various control commands or instructions to the DBW system/control unit 220.

The DBW system/control unit 220 may receive the commands or instructions from the motion planning and control layer 214 and translate such information into mechanical control signals for controlling wheel angle, brake and throttle of the vehicle 100. For example, DBW system/control unit 220 may respond to the computed steering wheel command angle by sending corresponding control signals to the steering wheel controller.

In various embodiments, the wireless communication subsystem 230 may communicate with other V2X system participants via wireless communication links to transmit sensor data, position data, vehicle data and data gathered about the environment around the vehicle by onboard sensors. Such information may be used by other V2X system participants to update stored sensor data for relay to other V2X system participants.

In various embodiments, the misbehavior management system stack 200 may include functionality that performs safety checks or oversight of various commands, planning or other decisions of various layers that could impact vehicle and occupant safety. Such safety check or oversight functionality may be implemented within a dedicated layer or distributed among various layers and included as part of the functionality. In some embodiments, a variety of safety parameters may be stored in memory and the safety checks or oversight functionality may compare a determined value (e.g., relative spacing to a nearby vehicle, distance from the roadway centerline, etc.) to corresponding safety parameter(s), and issue a warning or command if the safety parameter is or will be violated. For example, a safety or oversight function in the behavior planning and prediction layer 216 (or in a separate layer) may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to the motion planning and control layer 214 to speed up, slow down or turn if the current or predicted separation distance violates the safe separation distance parameter. As another example, safety or oversight functionality in the motion planning and control layer 214 (or a separate layer) may compare a determined or commanded steering wheel command angle to a safe wheel angle limit or parameter, and issue an override command and/or alarm in response to the commanded angle exceeding the safe wheel angle limit.

Some safety parameters stored in memory may be static (i.e., unchanging over time), such as maximum vehicle speed. Other safety parameters stored in memory may be dynamic in that the parameters are determined or updated continuously or periodically based on vehicle state information and/or environmental conditions. Non-limiting examples of safety parameters include maximum safe speed, maximum brake pressure, maximum acceleration, and the safe wheel angle limit, all of which may be a function of roadway and weather conditions.

Figure 2B:
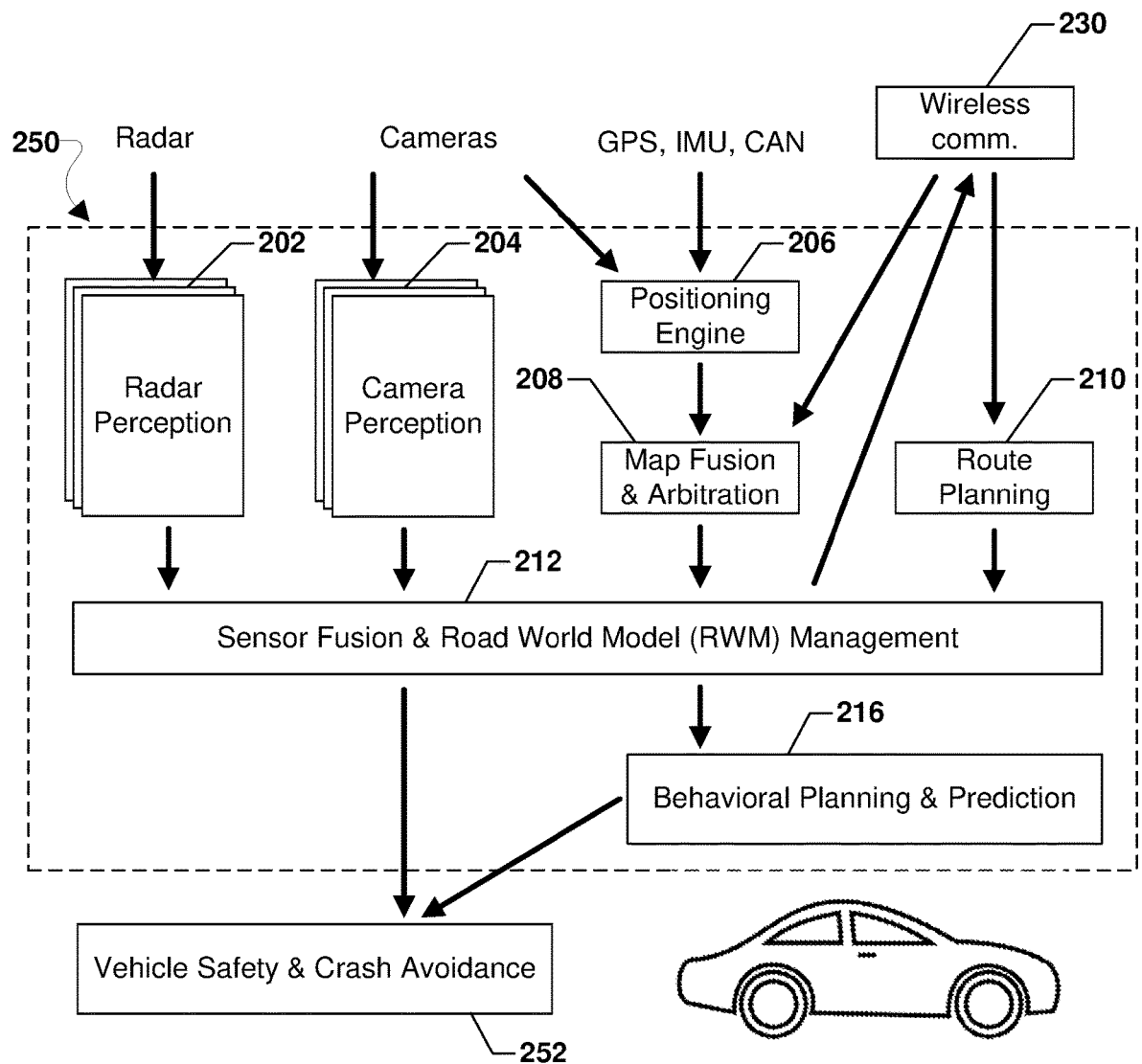
FIG. 2B is a component block diagram illustrating components of another example V2X system participant management system according to various embodiments

FIG. 2B illustrates an example of subsystems, computational elements, computing devices or units within a vehicle management system 250, which may be utilized within a vehicle 101. With reference to FIGS. 1A-2B, in some embodiments, the layers 202, 204, 206, 208, 210, 212, and 216 of the misbehavior management system stack 200 may be similar to those described with reference to FIG. 2A and the misbehavior management system stack 250 may operate similar to the misbehavior management system stack 200, except that the misbehavior management system stack 250 may pass various data or instructions to a vehicle safety and crash avoidance system 252 rather than the DBW system/control unit 220. For example, the configuration of the misbehavior management system stack 250 and the vehicle safety and crash avoidance system 252 illustrated in FIG. 2B may be used in a non-autonomous vehicle.

In various embodiments, the behavioral planning and prediction layer 216 and/or sensor fusion and RWM management layer 212 may output data to the vehicle safety and crash avoidance system 252. For example, the sensor fusion and RWM management layer 212 may output sensor data as part of refined location and state information of the vehicle 101 provided to the vehicle safety and crash avoidance system 252. The vehicle safety and crash avoidance system 252 may use the refined location and state information of the vehicle 101 to make safety determinations relative to the vehicle 101 and/or occupants of the vehicle 100. As another example, the behavioral planning and prediction layer 216 may output behavior models and/or predictions related to the motion of other vehicles to the vehicle safety and crash avoidance system 252. The vehicle safety and crash avoidance system 252 may use the behavior models and/or predictions related to the motion of other vehicles to make safety determinations relative to the vehicle 101 and/or occupants of the vehicle 101.

In various embodiments, the vehicle safety and crash avoidance system 252 may include functionality that performs safety checks or oversight of various commands, planning, or other decisions of various layers, as well as human driver actions, that could impact vehicle and occupant safety. In some embodiments, a variety of safety parameters may be stored in memory and the vehicle safety and crash avoidance system 252 may compare a determined value (e.g., relative spacing to a nearby vehicle, distance from the roadway centerline, etc.) to corresponding safety parameter(s), and issue a warning or command if the safety parameter is or will be violated. For example, a vehicle safety and crash avoidance system 252 may determine the current or future separate distance between another vehicle (as defined by the sensor fusion and RWM management layer 212) and the vehicle (e.g., based on the world model refined by the sensor fusion and RWM management layer 212), compare that separation distance to a safe separation distance parameter stored in memory, and issue instructions to a driver to speed up, slow down or turn if the current or predicted separation distance violates the safe separation distance parameter. As another example, a vehicle safety and crash avoidance system 252 may compare a human driver's change in steering wheel angle to a safe wheel angle limit or parameter, and issue an override command and/or alarm in response to the steering wheel angle exceeding the safe wheel angle limit.

Figure 3:
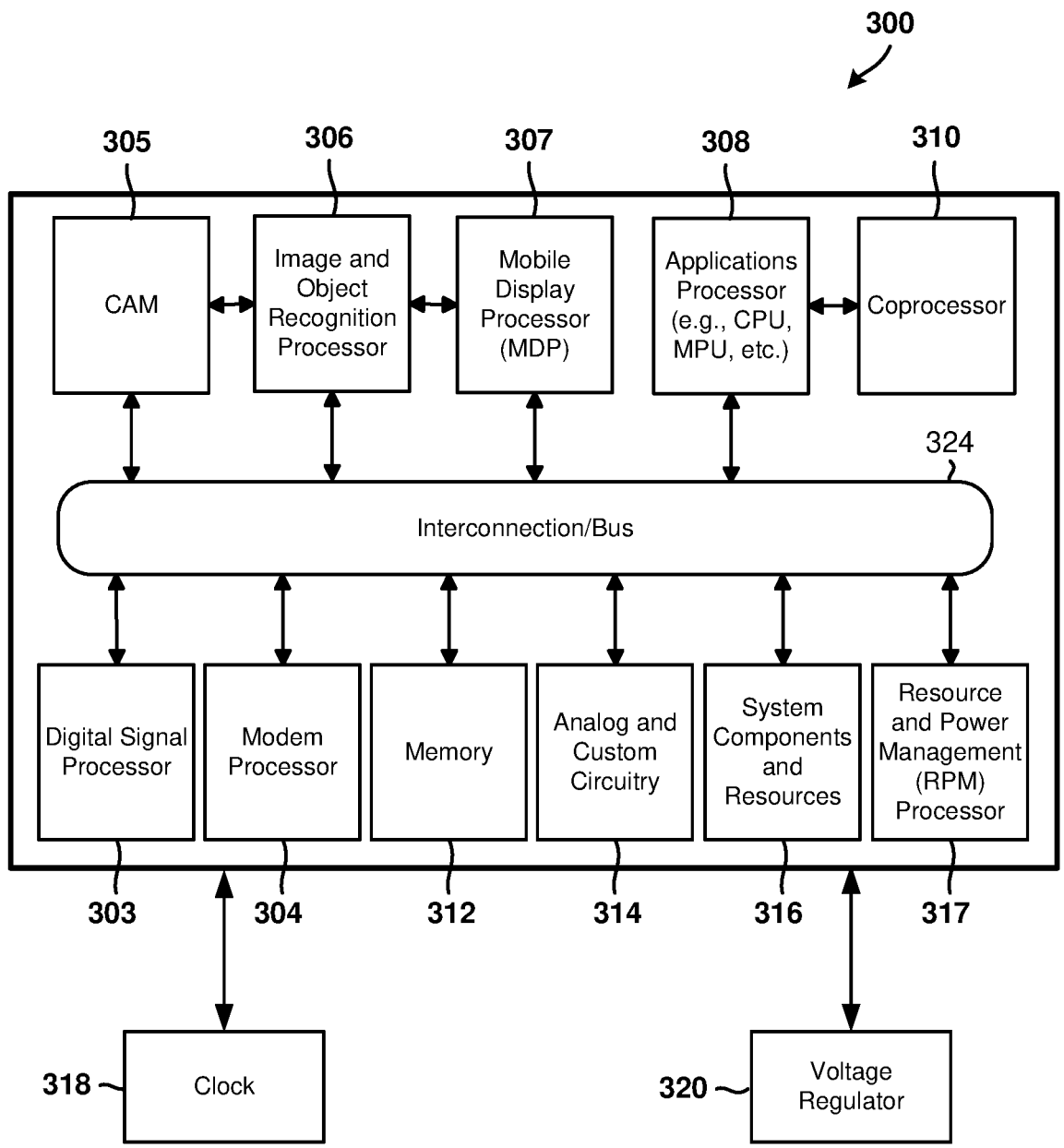
FIG. 3 is a block diagram illustrating components of a system on chip for use in a V2X system participant in accordance with various embodiments.

FIG. 3 illustrates an example system-on-chip (SOC) architecture of a processing device SOC 300 suitable for implementing various embodiments in vehicles. With reference to FIGS. 1A-3, the processing device SOC 300 may include a number of heterogeneous processors, such as a digital signal processor (DSP) 303, a modem processor 304, an image and object recognition processor 306, a mobile display processor 307, an applications processor 308, and a resource and power management (RPM) processor 317. The processing device SOC 300 may also include one or more coprocessors 310 (e.g., vector co-processor) connected to one or more of the heterogeneous processors 303, 304, 306, 307, 308, 317. Each of the processors may include one or more cores, and an independent/internal clock. Each processor/core may perform operations independent of the other processors/cores. For example, the processing device SOC 300 may include a processor that executes a first type of operating system (e.g., FreeBSD, LINUX, OS X, etc.) and a processor that executes a second type of operating system (e.g., Microsoft Windows). In some embodiments, the applications processor 308 may be the SOC's 300 main processor, central processing unit (CPU), microprocessor unit (MPU), arithmetic logic unit (ALU), etc. The graphics processor 306 may be graphics processing unit (GPU).

The processing device SOC 300 may include analog circuitry and custom circuitry 314 for managing sensor data, analog-to-digital conversions, wireless data transmissions, and for performing other specialized operations, such as processing encoded audio and video signals for rendering in a web browser. The processing device SOC 300 may further include system components and resources 316, such as voltage regulators, oscillators, phase-locked loops, peripheral bridges, data controllers, memory controllers, system controllers, access ports, timers, and other similar components used to support the processors and software clients (e.g., a web browser) running on a computing device.

The processing device SOC 300 also include specialized circuitry for camera actuation and management (CAM) 305 that includes, provides, controls and/or manages the operations of one or more cameras 158, 160 (e.g., a primary camera, webcam, 3D camera, etc.), the video display data from camera firmware, image processing, video preprocessing, video front-end (VFE), in-line JPEG, high definition video codec, etc. The CAM 305 may be an independent processing unit and/or include an independent or internal clock.

In some embodiments, the image and object recognition processor 306 may be configured with processor-executable instructions and/or specialized hardware configured to perform image processing and object recognition analyses involved in various embodiments. For example, the image and object recognition processor 306 may be configured to perform the operations of processing images received from cameras (e.g., 158, 160) via the CAM 305 to recognize and/or identify other vehicles, and otherwise perform functions of the camera perception layer 204 as described. In some embodiments, the processor 306 may be configured to process radar or lidar data and perform functions of the radar perception layer 202 as described.

The system components and resources 316, analog and custom circuitry 314, and/or CAM 305 may include circuitry to interface with peripheral devices, such as cameras 158, 160, radar 168, lidar 170, electronic displays, wireless communication devices, external memory chips, etc. The processors 303, 304, 306, 307, 308 may be interconnected to one or more memory elements 312, system components and resources 316, analog and custom circuitry 314, CAM 305, and RPM processor 317 via an interconnection/bus module 324, which may include an array of reconfigurable logic gates and/or implement a bus architecture (e.g., CoreConnect, AMBA, etc.). Communications may be provided by advanced interconnects, such as high-performance networks-on chip (NoCs).

The processing device SOC 300 may further include an input/output module (not illustrated) for communicating with resources external to the SOC, such as a clock 318 and a voltage regulator 320. Resources external to the SOC (e.g., clock 318, voltage regulator 320) may be shared by two or more of the internal SOC processors/cores (e.g., a DSP 303, a modem processor 304, a graphics processor 306, an applications processor 308, etc.).

In some embodiments, the processing device SOC 300 may be included in a control unit (e.g., 140) for use in a vehicle (e.g., 100). The control unit may include communication links for communication with a telephone network (e.g., 180), the Internet, and/or a network server (e.g., 184) as described.

The processing device SOC 300 may also include additional hardware and/or software components that are suitable for collecting sensor data from sensors, including motion sensors (e.g., accelerometers and gyroscopes of an IMU), user interface elements (e.g., input buttons, touch screen display, etc.), microphone arrays, sensors for monitoring physical conditions (e.g., location, direction, motion, orientation, vibration, pressure, etc.), cameras, compasses, GPS receivers, communications circuitry (e.g., Bluetooth®, WLAN, WiFi, etc.), and other well-known components of modern electronic devices.

In order to determine whether a misbehavior condition may have occurred, a misbehavior detection module of the V2X system may determine whether the generation and/or receipt of V2X messages indicates a misbehavior condition.

Figure 4:
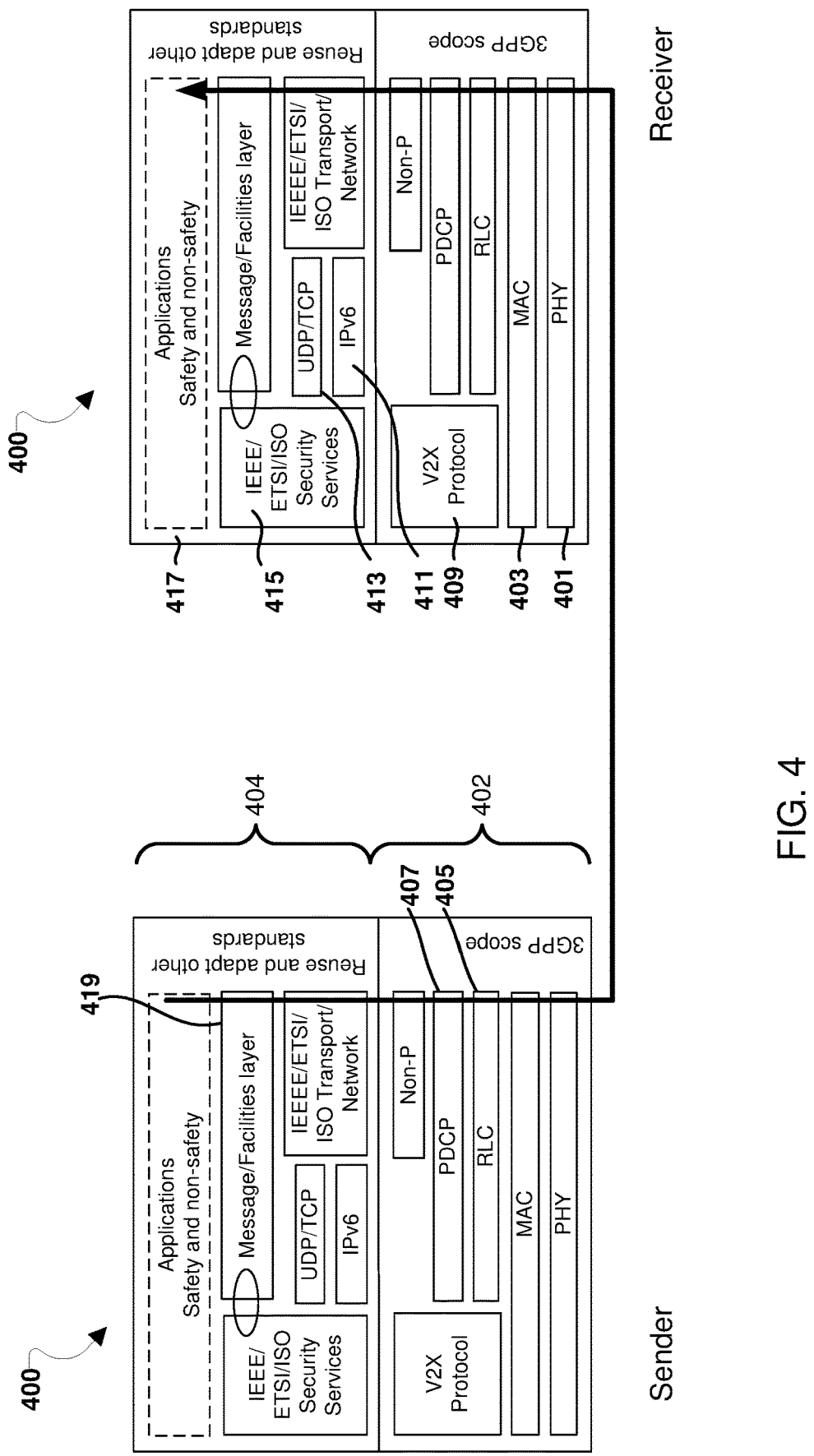
FIG. 4 illustrates an ITS model stack architecture for V2X systems.

FIG. 4 illustrates an ITS model stack architecture for V2X systems. The ITS model stack follows the principles of the open system interconnection (OSI) model stack for layered communication protocols. The ITS model stack 400 may reuse existing radio and lower layers such as the physical (PHY) layer 401 and media access control (MAC) layer 403 as well as existing networking and transportation layers such as the radio link control (RLC) layer 405 and Packet Data Convergence Protocol (PDCP) layer 407 as well as the User Datagram Protocol (UDP)/Transmission Control Protocol (TCP) 413. An internet layer may include the internet protocol version 6 (IPv6) 411. An ITS application 417 may be included in the application layer. The V2X protocol 409 may provide an interface between the upper layer 404 and the lower layers 402 in the communication protocol stack.

In operation, an ITS application 417 may make a request to generate a V2X message. The request to generate a V2X message may be based on a number of factors. For example, the ITS application may seek to generate a V2X message on a known frequency to report the V2X system participant's location, speed, heading, etc. In other instances, when specific sensor data exceeds pre-set thresholds, the ITS application may set criteria to generate and report out such a condition through a V2X message. The ITS application 417 may make its request to the message/facilities layer 419 to initiate the generation of the V2X message. Upon receiving the request to generate a V2X message, the message/facilities layer 419 may assemble the V2X message to include any relevant sensor data. In addition, the message/facilities layer 419 may communicate with the security services module 415 in order to apply any appropriate security credential that may be mandated by the particular V2X system within which the participant is operating. Once the security credential is applied to the V2X message, the V2X message may propagate through the ITS model stack for transmission to other V2X system participants. In addition, the V2X protocol 409 may include a misbehavior module that monitors the V2X messages to detect whether a misbehavior condition is indicated in the V2X message. In addition, the V2X protocol 409 may determine whether the generation or receipt of V2X messages may indicate whether a misbehavior condition has occurred. In response to determining that a misbehavior condition has occurred, the V2X protocol 409 may generate and transmit a misbehavior report to a misbehavior management authority or some other entity. In response to determining that a misbehavior condition has not occurred, the V2X protocol 409 may permit the generation and transmission of the V2X message to other V2X system participants. The ITS model stack architecture may be present in each V2X system operating within each V2X system participant device. Thus, received V2X messages may also be applied to the ITS model stack in a reverse order as messages are received. However, in both the case of generating V2X messages and receiving V2X messages, the V2X protocol 409 may monitor the V2X messages for misbehavior conditions.

Figure 5A:
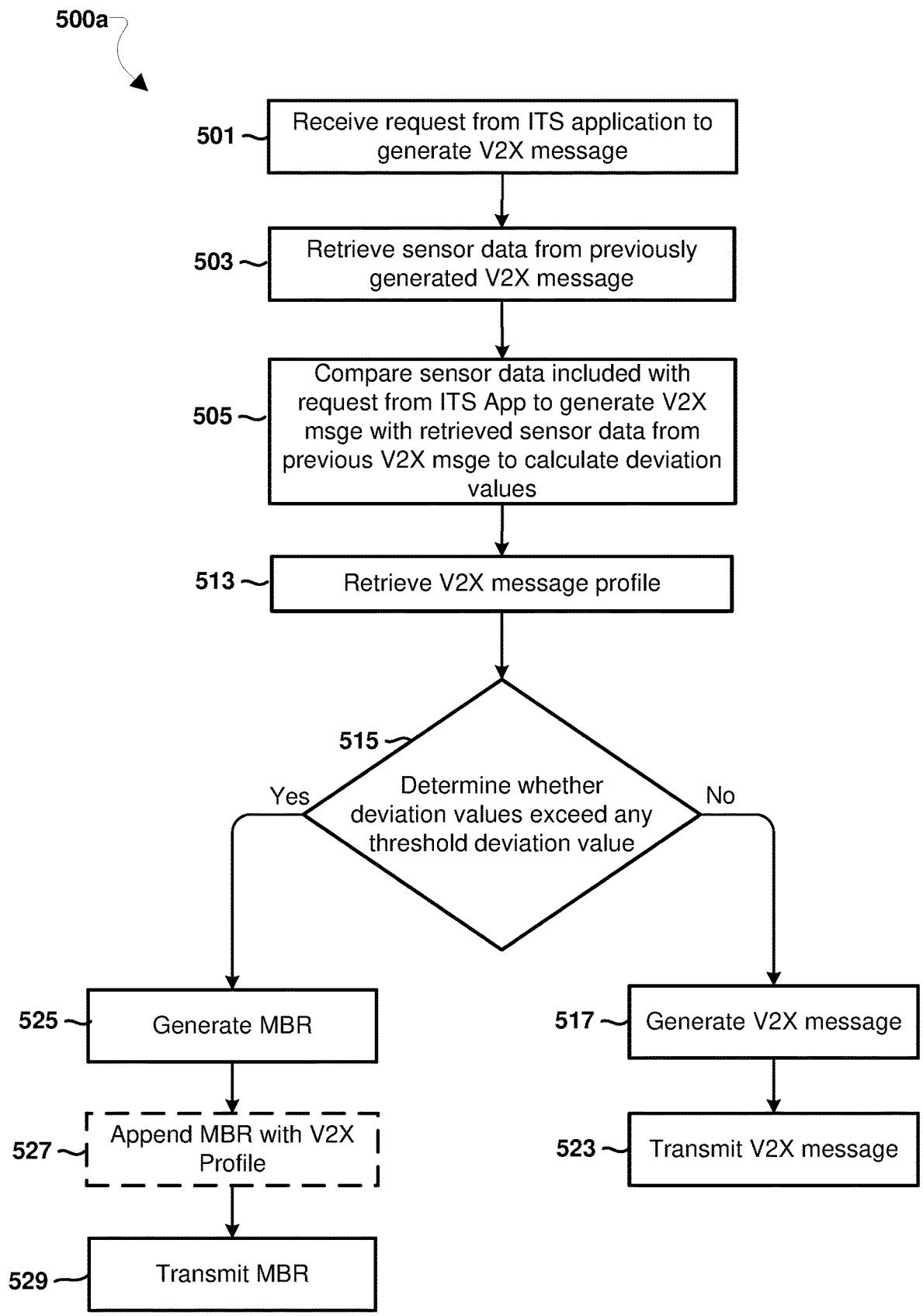
FIG. 5A is a process flow diagram illustrating operations of a method for detecting a misbehavior condition related to the generation of a V2X message consistent with various embodiments disclosed herein.

FIG. 5A illustrates operations of a method of detecting a misbehavior condition 500a related to the generation of a V2X message consistent with various embodiments. With reference to FIGS. 1-5A, the operations of the method 500a may be performed by a V2X processing device in a V2X node (e.g., 200).

In block 501, the V2X system processor may receive a request from an ITS application to generate a V2X message. As discussed above, the ITS application may seek to generate a V2X message on a known frequency to report the V2X system participant's location, speed, heading, etc. In other instances, when specific sensor data exceeds pre-set thresholds, the ITS application may seek to generate and report out such a condition through a V2X message.

In block 503, the V2X system processor may retrieve the sensor data from the previously generated V2X message as part of the V2X misbehavior detection routine directed by the V2X protocol. The sensor data from the previously generated V2X message may include a timestamp indicating a time of the previously generated V2X message. In addition, the sensor data from the previously generated V2X message may include speed, position, and heading data.

In block 505, the V2X processor may determine a deviation value for each of the sensor data. For example, the V2X processor may calculate the following deviation values:

$\delta\tau = |\tau_t - \tau_{(t-1)}|$ temporal deviation value associated with V2X message $\delta_\theta = |\theta_{t, ego} - \theta_{(t-1), ego}|$ heading deviation value $\delta_P = |\|\vec{P}_{t, ego}\| - \|\vec{P}\||$ position deviation value $\delta_v = |\|\vec{v}_{t, ego}\| - \|\vec{v}_{(t-1), ego}\||$ velocity deviation value where:
τ is the generation time for a V2X message,
θ is the heading of the V2X system participant,
P is the position vector of the V2X system participant,
v is the velocity vector of the V2X system participant.

For example, to calculate the temporal deviation value (also referred to as a minimum frequency threshold and/or maximum frequency threshold), the V2X processor may calculate the absolute value of the difference between the time of generation of the instant V2X message and the previously generated V2X message. In a similar manner, each of the heading deviation, position deviation and velocity deviation values may be calculated.

In block 513, the V2X system processor may retrieve a V2X message profile. In some embodiments, the V2X profile may be a default profile that is stored in local memory. In some embodiments, as discussed in more detail below, the V2X profile (and the V2X message parameters contained therein) may vary as the V2X system participant travels from one geographic region to another. By retrieving the V2X profile, the V2X system processor may reference the stored parameter values for a valid V2X message. The V2X message profile may contain a variety of parameter values. These parameter values may include sensor deviation threshold values, security credential parameter values, sensor spatial threshold values, and/or threshold event data values. For example, the V2X profile may contain sensor deviation threshold values. As discussed above, various sensor deviation values may be calculated (e.g., temporal, heading, position, velocity). The sensor threshold values ensure that the status of V2X system participant (e.g., vehicle) does not vary significantly between subsequent V2X message. Put another way, the time between V2X message, vehicle heading, vehicle position, and vehicle velocity does not vary significantly between V2X messages.

In addition, the V2X profile may identify conditions that may be characteristic of a valid V2X message. These conditions may be spatial-based conditions and/or event-based conditions.

Some V2X systems may mandate that the V2X system participant be in a particular spatial position when generating a V2X message. For example, a V2X system may mandate that V2X system participants be at a traffic light (or within some distance to a stationary V2X participant, such as a road sign, traffic signal etc.) when generating a valid V2X message. Thus in some embodiments, a V2X system participant's GPS position data at the time of V2X message generation may be obtained and appended to generated V2X messages. This appended GPS sensor data may be compared to threshold spatial data values contained in the V2X message profile to insure that the V2X system participant is within a spatial distance to a landmark or acceptable position/location when the V2X message is generated.

In some embodiments, the V2X profile may identify event conditions that may be characteristic of a valid V2X message. Some V2X systems may mandate that the V2X system participant is experiencing a particular when generating a V2X message. For example, a V2X system may mandate that V2X system participants generate V2X message in adverse weather conditions. Thus, the V2X system may mandate that the windshield wipers, head lights, fog lights may be activated when generating a valid V2X message. To address this, in some embodiments, a V2X system participant may obtain sensor data regarding vehicle system status, such as status of head lights, windshield wipers, or fog lights, as indicators of an event that is occurring, and such vehicle event data may be appended to the generated V2X messages. This appended vehicle event data may be compared to threshold event data values contained in the V2X message profile to insure that the V2X system participant is experiencing a particular event when the V2X message is generated.

In some embodiments, the V2X message profile may contain security credential parameters that characterize a valid security credential that may be applied to a V2X message. For example, the security credential parameters contained in the V2X message profile may identify a particular type of security credential certificate type or a frequency at which a full security credential certificate should be attached to a V2X message. Various security credential parameters are discussed in more detail herein.

In determination block 515, the V2X system processor may determine whether any of the calculated deviation values exceeds a predetermined threshold value. For example, in a particular V2X system, there may be a maximum temporal frequency and a minimum temporal frequency for V2X message generation. In other words, the V2X system expects each V2X system participant to generate a V2X message within a range of time such that V2X message generation is not too fast, but also not too slow. V2X message generation that is too fast may cause congestion on the communication channel or overload a receiving V2X processor. However, V2X message generation that is too slow may not update the V2X system participant's status sufficiently. In instances where too much time elapses between V2X messages, the heading, position or velocity may deviate well past acceptable thresholds. In each of these situations a misbehavior condition may be indicated. The sensor deviation value thresholds may be hard coded to the V2X system processor or may be retrieved from a V2X message profile as described in more detail below.

Therefore, in response to the V2X processor determining that none of the calculated deviation values do not exceed any respective threshold deviation value (i.e., determination block 515=No), the V2X processor may generate the V2X message in block 517 and transmit the generated V2X message to other V2X system participants in block 523.

However, in response to the V2X processor determining that any of the calculated deviation values does exceed the respective threshold deviation values (i.e., determination block 515=Yes), the V2X processor may generate a misbehavior report (MBR) in block 525.

In some embodiments, the V2X processor may identify the detected misbehavior condition as a violation of the generation rules. In order to support the determination of the misbehavior condition as a violation of the generation rules, the V2X system processor may append the MBR with the V2X message profile or append an index of a pre-agreed V2X message profile in optional block 527. In some embodiments, the amount data that is transmitted or received within the MBR may be reduced by appending an index value of a pre-agreed V2X message profile may be appended to the MBR, with the index referring to a particular profile within a list or database of pre-agreed V2X message profiles that may be stored in memory within or accessible by the V2X processor. When received, the V2X processor may retrieve the pre-agreed V2X message profile by using the index value to identify or look up the correct profile from the list or database of pre-agreed V2X message profiles.

In block 529, the V2X processor may transmit the MBR to the misbehavior management authority 74 directly, or indirectly through an OEM server 70, 72 in block 529.

Figure 5B:
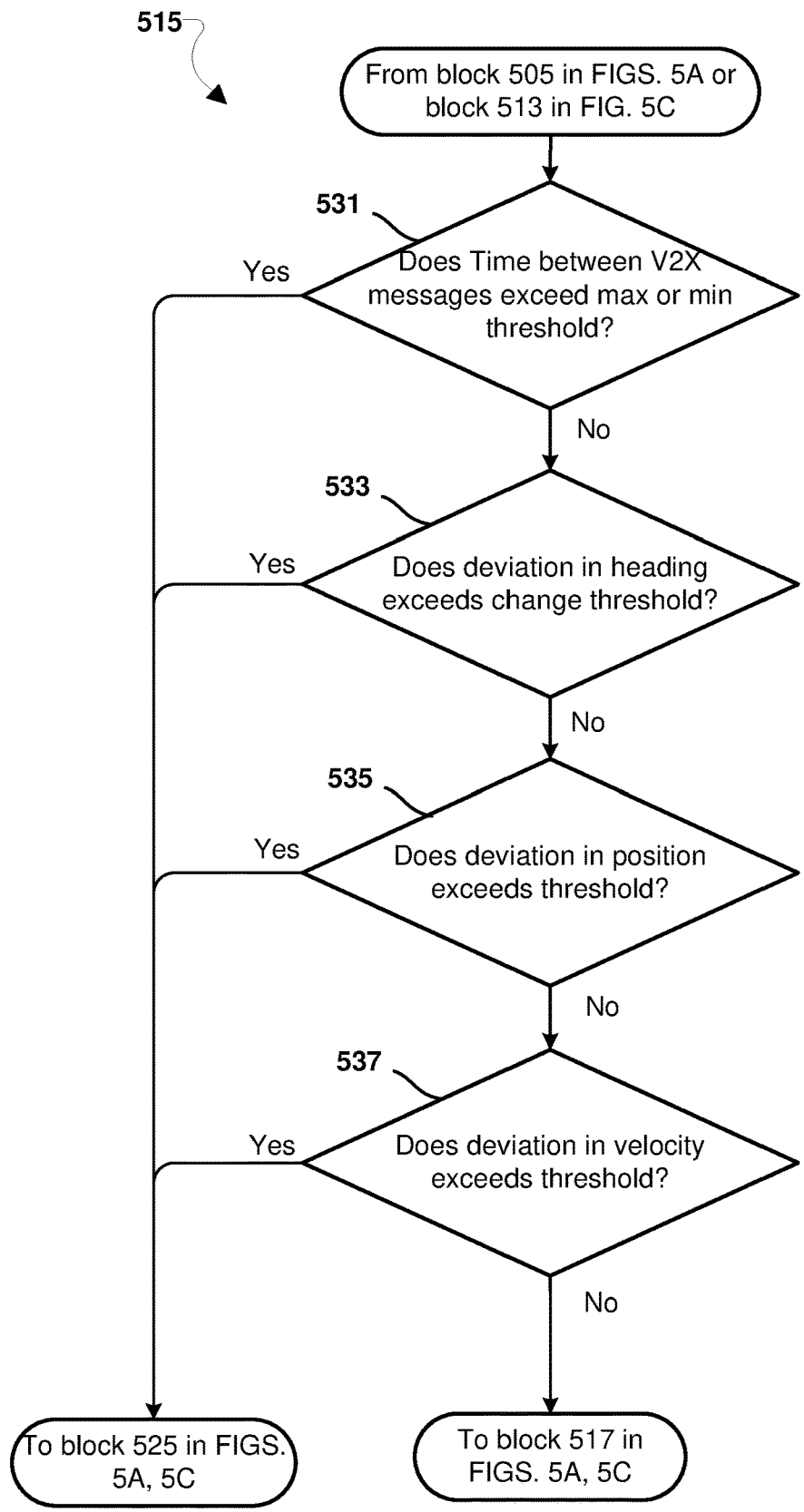
FIG. 5B is a process flow diagram illustrating operations of a method for detecting a misbehavior condition occurring during the generation of a V2X message consistent with various embodiments disclosed herein.

FIG. 5B illustrates operations that may be performed as part of determination block 515 of whether any of the calculated deviation values exceeds a predetermined threshold value in more detail. With reference to FIGS. 1-5B, the operations of the method 500a may be performed by a V2X processing device in a V2X node (e.g., 200).

After performing the operations of block 505 of the method 500a (or block 513 of the method 500b (FIG. 5C)), the V2X processor may make a series of determinations regarding whether any of the calculated deviation values exceeds the predetermined thresholds for each respective value. For example, the time threshold may include both a minimum frequency time threshold and a maximum frequency time threshold. As discussed above, the V2X system may seek to avoid the generation of V2X messages too frequently as such frequent messages may congests the communication channels or overload the receiving V2X processor. In contrast, generating V2X message too slowly may not provide accurate and consistent status data of the V2X system participant that is generating such V2X messages. For example, in some V2X systems, the maximum frequency may be one V2X message per 100 milliseconds, while the minimum frequency may be one V2X message per second, although lesser or greater maximum and minimum frequency thresholds may be set.

In determination block 531, the V2X processor may determine whether the elapsed time between the instant V2X message and the previously generated V2X message exceeds either the maximum frequency threshold or the minimum frequency threshold.

In response to determining that the elapsed time between the instant V2X message and the previously generated V2X message does exceed either the maximum frequency threshold or the minimum frequency threshold (i.e., determination block 531=Yes), the V2X processor may generate a misbehavior report in block 525 in the method 500a, and transmit the MBR to the to the misbehavior management authority 74 directly, or indirectly through an OEM server 70, 72 in block 529 as described.

In response to determining that the elapsed time between the instant V2X message and the previously generated V2X message does not exceed either the maximum frequency threshold or the minimum frequency threshold (i.e., determination block 531=No), the V2X processor may determine whether the calculated deviation value in the heading of the V2X system participant exceeds a heading deviation threshold value in determination block 533. In navigation, the heading of V2X system participant may refer to the compass direction in which the long axis of the V2X system participant may be pointed. A heading may be measured in radians or degrees, wherein a true north may be designated as zero (0) or three hundred sixty (360) degrees. The calculated deviation may indicate how many degrees the heading has varied. Over a short durations such as the one millisecond duration between V2X messages, the heading deviation may be only a few degrees. Dramatic heading deviations over such a short duration may indicate that the V2X system participant (e.g., vehicle) is spinning out of control (i.e., a misbehavior condition).

In response to determining that the heading deviation between the instant V2X message and the previously generated V2X message does exceed heading deviation threshold (i.e., determination block 533=Yes), the V2X processor may generate a misbehavior report in block 525 in the method 500*a*, and transmit the MBR to the to the misbehavior management authority 74 directly, or indirectly through an OEM server 70, 72 in block 529 as described.

In response to determining that the heading deviation between the instant V2X message and the previously generated V2X message does not exceed heading deviation threshold (i.e., determination block 533=No), the V2X processor may determine whether the calculated deviation value in the position of the V2X system participant exceeds a position deviation threshold value in determination block 535. A V2X system participant's (i.e., vehicle) position may be determined through a GPS sensor or perhaps a visual location sensor (i.e., camera). The calculated deviation may indicate how far the vehicle has traveled. Over a short durations such as the one millisecond duration between V2X messages, the position deviation may be only a feet or yards. Dramatic position deviations over such a short duration may indicate that the V2X system participant (e.g., vehicle) is moving at a great rate of speed such as in an accident (i.e., a misbehavior condition).

In response to determining that the position deviation between the instant V2X message and the previously generated V2X message does exceed position deviation threshold (i.e., determination block 535=Yes), the V2X processor may generate a misbehavior report in block 525 in the method 500*a*, and transmit the MBR to the to the misbehavior management authority 74 directly, or indirectly through an OEM server 70, 72 in block 529 as described.

In response to determining that the position deviation between the instant V2X message and the previously generated V2X message does not exceed position deviation threshold (i.e., determination block 535=No), the V2X processor may determine whether the calculated deviation value in the velocity of the V2X system participant exceeds a velocity deviation threshold value in determination block 537. A V2X system participant's (i.e., vehicle) velocity may be determined through an accelerometer or speedometer or may be derived from a vehicle's tachometer or other sensor. The calculated deviation may indicate how fast the vehicle is traveling. In some positions, posted speed limits may mandate the speed or velocity that a vehicle may travel. Exceeding such posted speed limits may indicate a misbehavior condition. In addition, sudden changes in velocity (e.g., acceleration) may indicate that the vehicle is in an accident (i.e., a misbehavior condition).

In response to determining that the velocity deviation between the instant V2X message and the previously generated V2X message exceeds a velocity deviation threshold (i.e., determination block 537=Yes), the V2X processor may generate a misbehavior report in block 525 in the method 500*a*, and transmit the MBR to the to the misbehavior management authority 74 directly, or indirectly through an OEM server 70, 72 in block 527 as described.

In response to determining that the velocity deviation between the instant V2X message and the previously generated V2X message does not exceed the velocity deviation threshold (i.e., determination block 537=No), indicating generation of the V2X message does not exceed any deviation threshold, the V2X processor may generate the V2X message in block 517 and transmit the V2X message to other V2X system participants in block 523 of the method 500*a* as described.

Figure 5C:
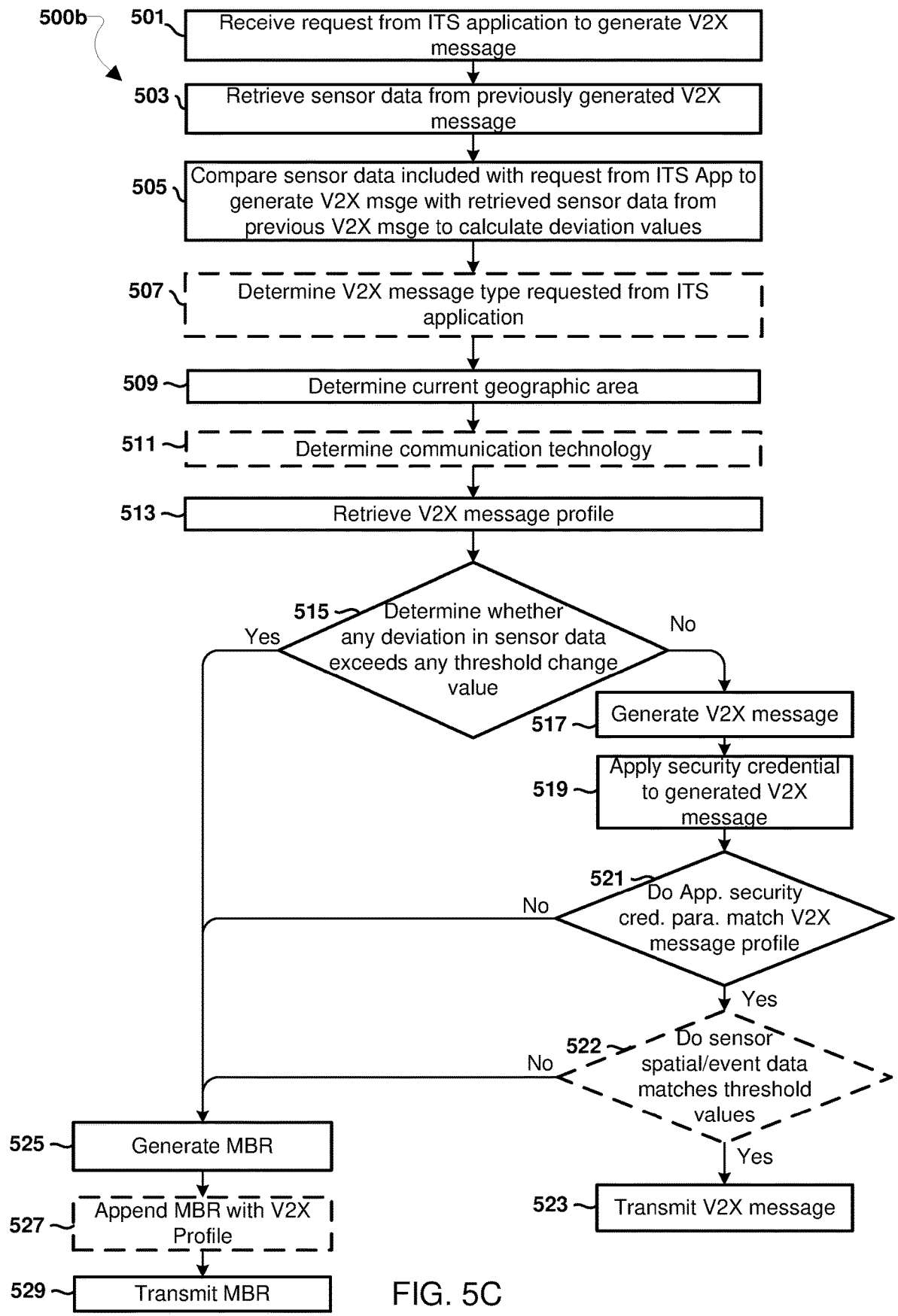
FIG. 5C is a process flow diagram illustrating operations of a method for detecting a misbehavior condition including security credential detection related to the generation of a V2X message consistent with various embodiments disclosed herein.

FIG. 5C illustrates another embodiment method 500*b* of detecting a misbehavior condition including security credential detection related to the generation of a V2X message consistent with various embodiments. With reference to FIGS. 1-5C, the operations of the method 500*a* may be performed by a V2X processing device in a V2X node (e.g., 200). The method 500*b* includes operations of like numbered blocks of the method 500*a* as described with reference to FIG. 5A, plus additional analysis of a security credential that may be applied to a V2X message in block 519 and determination block 521.

In blocks 501, 503, and 505 the V2X processor may perform operations of the like numbered blocks of the method 500*a* as described.

In block 507, the V2X processor may optionally determine the type of V2X message that is requested from an ITS application. Different V2X messages may follow different protocols. For example, while BSM/CAM may have a particular maximum and minimum frequency threshold value, a SPAT, CPM, DENM, or MAP message may have completely different deviation value thresholds. Thus, by determining what type of V2X message is requested for generation, the appropriate threshold value may be used in determination block 515.

In block 509, the V2X system processor may determine the current geographic area in which the V2X system participant is located. The current geographic area may be determined, for example, through a GPS sensor. Different geographic areas may mandate different protocols and threshold values. For example, the BSM is a message generated in ITS systems deployed in North America, whereas the CAM is a message used in ITS systems deployed Europe. The various thresholds associated with each V2X message may be impacted by the current geographic area that the V2X system participant is located. For example, in some countries, areas, region, the communication systems may not be as robust as in others. In addition, traffic in urban areas may be denser than in rural areas. Each of these factors may impact communication channel congestion. Thus, in areas in which communication channel congestion may be more prevalent (either due to V2X system participant density or communication infrastructure), the maximum and minimum frequency thresholds may vary to mitigate against communication channel congestion. Thus, the current geographic area location may impact the V2X system's misbehavior detection determinations.

In block 511, the V2X system processor may also optionally determine the type of communication technology that the V2X system participant may be employing to transmit and receive V2X message. For similar reasons as discussed above, the type of communication technology that is being used may impact communication channel bandwidth and congestion.

In block 513, the V2X system processor may retrieve a V2X message profile. As discussed above, a number of factors may impact the sensor deviation value thresholds. These factors may include, V2X message type, current geographic area, and communication technology that is being used. Based on these determined values, the V2X system processor may retrieve an appropriate V2X message profile. The V2X message profile may contain the appropriate sensor deviation value thresholds that may determine whether the generation of a V2X message represents a misbehavior condition. For example, as a vehicle (i.e., V2X system participant) travels from one geographic area to another (e.g., country to country, urban to rural, etc.), the vehicle may retrieve a new V2X message profile so that the appropriate threshold values are used to determine whether a misbehavior condition has occurred.

As described, the retrieved V2X message profile may further contain characteristics and a parameters that are mandated for the application of security credentials to V2X messages. Such security credential mandates, in particular, may be impacted by variations in geographic location. These security credential parameters may include a signature algorithm, signature algorithm parameters, an encryption algorithm, encryption algorithm parameters, a security credential certificate type, a full security credential attach rate, security credential header fields, security credential header checks, and a pseudonym change strategy.

In determination block 515, the V2X processor may determine whether deviation values exceed any threshold deviation value using the correct V2X message profile retrieved in block 513.

As described, in response to the V2X processor determining that any of the calculated deviation values does exceed the respective threshold deviation values (i.e., determination block 515=Yes), the V2X processor may generate a misbehavior report in block 525 in the method 500*a*.

The V2X processor may optionally identify the detected misbehavior condition as a violation of the generation rules. In order to support the determination of the misbehavior condition as a violation of the generation rules, the V2X system processor may append the MBR with the V2X message profile or append an index of a pre-agreed V2X message profiles in optional block 527. As described, in some embodiments, a list or database of pre-agreed V2X message profiles that may be stored in memory within or accessible by V2X processors, which may allow the V2X system processor to communicate the appropriate V2X message profile to use by including only the index value corresponding to the appropriate profile within the list or database of pre-agreed V2X message profiles. Such embodiments may reduce the amount of information that is included in MBRs.

The V2X processor may also transmit the MBR to the to the misbehavior management authority 74 directly, or indirectly through an OEM server 70, 72 in block 529 of the method 500*a* as described.

In response to the V2X processor determining that none of the calculated deviation values do not exceed any respective threshold deviation value (i.e., determination block 515=No), the V2X processor may generate the V2X message in block 517 as described.

In block 519, a security services module within the V2X system processor may apply a security credential to the generated V2X message response to the V2X system processor generating a V2X message in block 517.

In determination block 521, the V2X system processor may determine whether the parameters of the applied security credential match the security credential parameters contained in the V2X message profile.

In response to the V2X system processor determining that the parameters of the security credential applied to the V2X message match the security credential parameters contained in the V2X message profile (i.e., determination block 521=Yes), the V2X processor may transmit the V2X message in block 523 of the method 500*a* as described or perform an optional determination regarding the spatial/event data in determination block 522.

In response to the V2X system processor determining that the parameters of the applied security credential do not match the security credential parameters contained in the V2X message profile (i.e., determination block 521=No), the V2X processor may generate a misbehavior report (MBR) in block 525 and optionally append the MBR with the V2X message profile or an index of a pre-agreed V2X message profile within a list or database of pre-agreed V2X message profiles in block 527 and transmit the MBR to the misbehavior management authority 74 directly, or indirectly through an OEM server 70, 72 in block 529 of the method 500*a* as described.

In some embodiments, in determination block 522, the V2X processor may determine whether the spatial and/or event data surrounding the generation of the V2X message satisfies requisite conditions for a valid V2X message generation. As described, the V2X message profile may contain threshold spatial data values. Some V2X systems may mandate that the V2X system participant (e.g., vehicle) is at specific positions when the V2X message is generated. For example, a V2X system may mandate that a vehicle be positioned at (or passing through) an intersection when the V2X message is generated. Other V2X system may mandate that the vehicle is within a threshold distance from a stationary V2X system participant (e.g., traffic light, road sign, etc.) when the V2X message is generated. Thus, in determination block 522, the V2X processor may compare the spatial position data associated with the generation of the V2X message with the threshold spatial data values contained in the V2X message profile.

In response to determining that the spatial position data associated with the generation of the V2X message matches the threshold spatial data values contained in the V2X message profile (i.e., determination 522=Yes), the V2X processor may transmit the V2X message in block 523.

In response to determining that the spatial position data associated with the generation of the V2X message does not match the threshold spatial data values contained in the V2X message profile (i.e., determination 522=No), the V2X processor may generate the MBR in block 525.

In some embodiments, in determination block 522, the V2X processor may compare the event data associated with the generation of the V2X message with the threshold event data values contained in the V2X message profile. As described, a V2X system may include the vehicle's use of wind shield wipers, head lights, or fog lights, etc. as events associated with the generation of a V2X message.

In response to determining that the event data associated with the generation of the V2X message matches the threshold event data values contained in the V2X message profile (i.e., determination 522=Yes), the V2X processor may transmit the V2X message in block 523.

In response to determining that the event data associated with the generation of the V2X message does not match the threshold event data values contained in the V2X message profile (i.e., determination 522=No), the V2X processor may generate the MBR in block 525.

To avoid a malicious actor from flooding the V2X system with false and misleading V2X message, each V2X message may include a security credential applied to the message to authenticate the messages to other V2X system participants. Typically, such security credentials follow a known protocol with mandated parameters.

For example, in Europe, the generation of CAM comes with a specific set of standardized rules regarding the inclusion of security data. These standardized rules may mandate that as default, the choice digest be included with the V2X message, where the choice digest may be an abbreviated version of a security credential certificate having a smaller data size (i.e., 10-32 bytes). Thus, the V2X message profile may mandate specific security credential certificate types be applied to the V2X message. In addition, standardized rules may mandate that the choice certificate be included once, one second after the last inclusion of the choice certificate, where the choice certificate may be a full version of the security credential certificate having a medium data size. Thus, the V2X message profile may mandate full security credential attach rate.

The standardized rules may mandate that if the ITS-S receives a CAM signed by a previously unknown AT, it shall include the choice certificate immediately in its next CAM, instead of including the choice digest. In such instances, the timer for the next inclusion of the choice certificate shall be restarted.

The standardized rules may also mandate that if an ITS-S receives a CAM that includes a tbsdata.headerInfo component of type inlineP2pcdRequest, then the ITS-S shall evaluate the list of certificate digests included in that component: If the ITS-S finds a certificate digest of the currently used authorization ticket in that list, the system may include a choice certificate immediately in its next CAM, instead of including the choice digest. Thus, the V2X message profile may mandate particular security credential header fields and security credential header checks.

In some standardized rules, there may be a mandate to include a certificate chain, which may include a large data size certificate that includes a set of certificates. In some standardized rules, the inclusion of security credentials or the type of security credential that is included may depend on the size of the V2X message. Larger V2X messages may not include security credentials as often as smaller sized V2X messages. Alternatively, smaller sized security credentials, such as the choice digest, may be used in instances in which the V2X message is larger.

In many areas, the standardized rules mandate such security credential rules to provide a secure V2X system, but also to limit the amount of data that may be included in the V2X message. For example, if every V2X message included the certificate chain as a way to authenticate the message, problems arising from communication channel congestion and receiving system processor overload may occur as too much data is sent and received. Thus, in some embodiments, a detection system may verify that the full certificate is not included too often as this could increase the channel congestion and computation overhead on the receiver.

As discussed above, the V2X message generation profiles may be regional or adjusted according to the context of the sender. Such regional adjustments may be particularly appropriate for security credential profiles. The inclusion of security credential may depend on the regional policy. For example, each country may not have the same communication infrastructure that may support the sending and receipt of robust security credentials on a continuous basis. In addition, not all connected V2X stations (e.g., roadside units and other stationary V2X system participants) may be equipped with C-V2X capabilities. Thus, the geographical context may vary from country to country, state to state, or one road to the next. For example, from a regional policy perspective, a V2X generation profile could state that an application should not insert a full certificate in each CAM due to limited available bandwidth. From a V2X message type perspective, a V2X generation profile could state that an application should not insert a certificate for some specific types of V2X messages due to their larger data size. For instance, a collective perception message (CPM) should only have its full certificate attached every 450 ms. Various embodiments ensure that each V2X message is generated according to standardized specifications and security policies. As stated earlier, various embodiments may be implemented in the misbehavior detection system of the V2X transmitter and receiver. By retrieving an appropriate V2X message profile in block 513 in the method 500b as described, regional mandates for security policies and communication channel control may be followed.

Figure 5D:
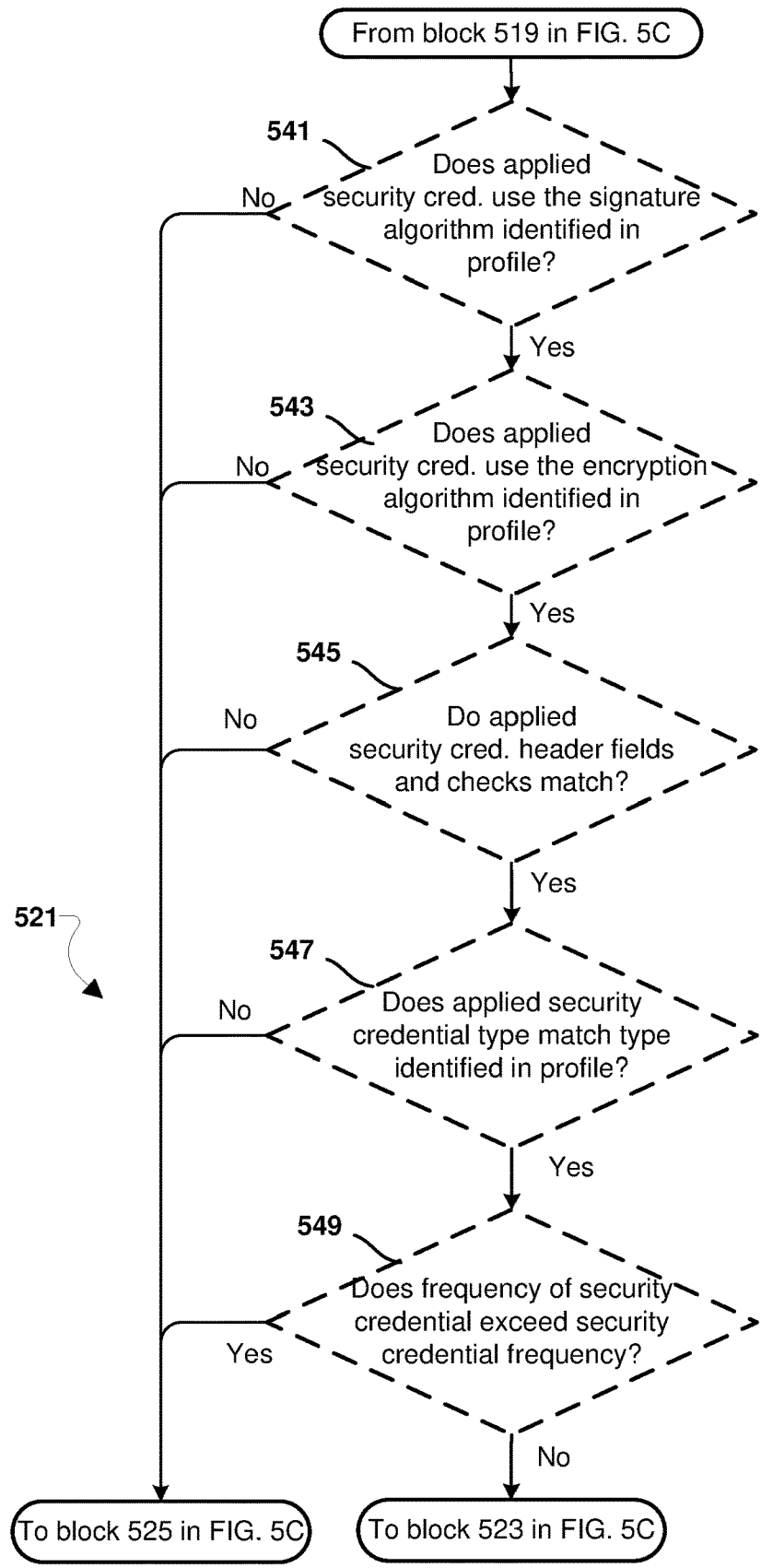
FIG. 5D is a process flow diagram illustrating operations of a method for detecting a misbehavior condition based on the security credential applied to a V2X message consistent with various embodiments disclosed herein.

FIG. 5D illustrates operations that may be performed as part of determination block 521 of the method 500b. With reference to FIGS. 1A-5D, the operations of determination block 521 may be performed by a V2X processing device in a V2X node (e.g., 200). Determination block 521 may include any and/or all of optional determination blocks 541-549. Depending on which security credential parameters may be included in the V2X message profile, various determinations may be made to determine whether the security credential parameters of the applied security credential match the security credential parameters included in the V2X message profile.

In determination block 541, the V2X system processor may determine whether the security credential that is applied to a V2X message in block 519 uses the signature algorithm and/or signature algorithm parameters contained in the retrieved V2X message profile. In response to determining that the signature algorithm and/or signature algorithm parameters of the applied security credential do not match the signature algorithm and/or signature algorithm parameters identified in the retrieved V2X message profile (i.e., determination block 541=No), the V2X system processor may generate a misbehavior report (MBR) in block 525 and transmit the MBR to the misbehavior management authority 74 directly, or indirectly through an OEM server 70, 72 in block 529 of the method 500a as described.

In response to determining that the signature algorithm and/or signature algorithm parameters of the applied security credential match the signature algorithm and/or signature algorithm parameters identified in the retrieved V2X message profile (i.e., determination block 541=Yes), the V2X system processor may utilize any of the other optional determination blocks before the V2X processor transmits the V2X message in block 523 of methods 500a or 500b as described.

In determination block 543, the V2X system processor may determine whether the security credential that is applied to a V2X message in block 519 uses the encryption algorithm and/or encryption algorithm parameters contained in the retrieved V2X message profile.

In response to determining that the encryption algorithm and/or encryption algorithm parameters of the applied security credential do not match the encryption algorithm and/or encryption algorithm parameters identified in the retrieved V2X message profile (i.e., determination block 543=No), the V2X system processor may generate a misbehavior report (MBR) in block 525 and transmit the MBR to the misbehavior management authority 74 directly, or indirectly through an OEM server 70, 72 in block 529 of the method 500a as described.

In response to determining that the encryption algorithm and/or encryption algorithm parameters of the applied security credential match the encryption algorithm and/or encryption algorithm parameters identified in the retrieved V2X message profile (i.e., determination block 543=Yes), the V2X system processor may utilize any of the other optional determination blocks before the V2X processor may transmit the V2X message in block 523 of methods 500a or 500c as described.

In determination block 545, the V2X system processor may determine whether the security credential that is applied to a V2X message in block 519 uses the security credential header fields and checks contained in the retrieved V2X message profile.

In response to determining that the security credential header fields and checks of the applied security credential do not match the security credential header fields and checks contained in the retrieved V2X message profile (i.e., determination block 545=No), the V2X system processor may generate a misbehavior report (MBR) in block 525 and transmit the MBR to the misbehavior management authority 74 directly, or indirectly through an OEM server 70, 72 in block 529 of the method 500$a$ as described.

In response to determining that the security credential header fields and checks of the applied security credential match the security credential header fields and checks identified in the retrieved V2X message profile (i.e., determination block 545=Yes), the V2X system processor may utilize any of the other optional determination blocks before the V2X processor may transmit the V2X message in block 523 of methods 500$a$ or 500$c$ as described.

In determination block 547, the V2X system processor may determine whether the security credential type that is applied to a V2X message in block 519 is the security credential type identified in the retrieved V2X message profile.

In response to determining that the security credential type of the applied security credential does not match the security credential type identified in the retrieved V2X message profile (i.e., determination block 547=No), the V2X system processor may generate a misbehavior report (MBR) in block 525 and transmit the MBR to the misbehavior management authority 74 directly, or indirectly through an OEM server 70, 72 in block 529 of the method 500$a$ as described.

In response to determining that the security credential type of the applied security credential matches the security credential type identified in the retrieved V2X message profile (i.e., determination block 547=Yes), the V2X system processor may utilize any of the other optional determination blocks before the V2X processor may transmit the V2X message in block 523 of methods 500$a$ or 500$c$ as described.

In determination block 549, the V2X system processor may determine whether the frequency at which a full security credential certificate is applied to a V2X message in block 519 exceeds (either higher or lower) a threshold value identified in the retrieved V2X message profile.

In response to determining that the frequency at which a full security credential certificate is applied to a V2X message exceeds the threshold value (i.e., determination block 549=Yes), the V2X system processor may generate a misbehavior report (MBR) in block 525 and transmit the MBR to the misbehavior management authority 74 directly, or indirectly through an OEM server 70, 72 in block 529 of the method 500$a$ as described.

In response to determining that the frequency at which a full security credential certificate is applied to a V2X message does not exceed the threshold value (i.e., determination block 547=No), the V2X system processor may utilize any of the other optional determination blocks before the V2X processor may transmit the V2X message in block 523 of methods 500$a$ or 500$c$ as described.

Figure 5E:
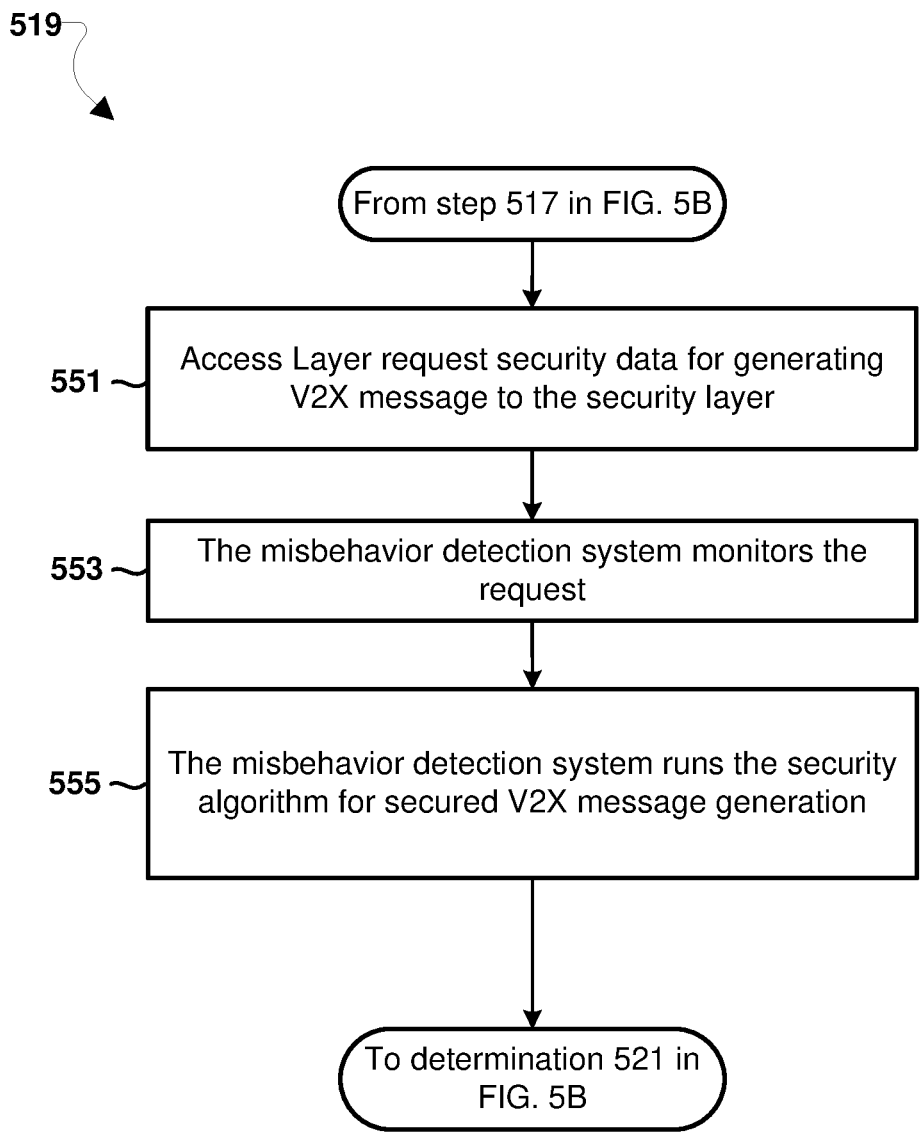
FIG. 5E is a process flow diagram illustrating operations of a method for applying a security credential to a generated V2X message consistent with various embodiments disclosed herein.

FIG. 5E illustrates example operations related to the application of a security credential to a V2X message in block 519 of the method 500$b$ in more detail. With reference to FIGS. 1A-5E, the operations of block 519 may be performed by a V2X processing device in a V2X node (e.g., 200).

As part of the V2X message generation, the V2X system processor may make a request from the access layer to the security module 415 to request security data in block 551. The requested security data may include the security credential type and specific credential information. The security module 415 may apply the requested security credential to the V2X message.

In block 553, the V2X protocol 409 module of the V2X system processor may execute the misbehavior detection system to continually monitor the generated and received V2X messages to determine whether a misbehavior condition has occurred. As part of the monitoring process, the misbehavior detection system may execute determination block 515 in the methods 500$a$ and 500$c$ as described.

In block 555, the misbehavior detection system may run the security algorithm for secured V2X message generation, such as by performing the operations in determination block 521 of the method 500$b$ as described to insure that the type and frequency of security credential is appropriate for a particular V2X system.

In some embodiments, a misbehavior condition may be detected by the V2X message receiver. From a V2X message receiver perspective, the security module 415 and misbehavior detection system may ensure the absence of anomaly related the V2X message content. Thus, a misbehavior detection system and cryptographic security system (e.g., HSM) may ensure the correctness of the V2X data before assessing the requirements for generating a secured V2X message.

Figure 6A:
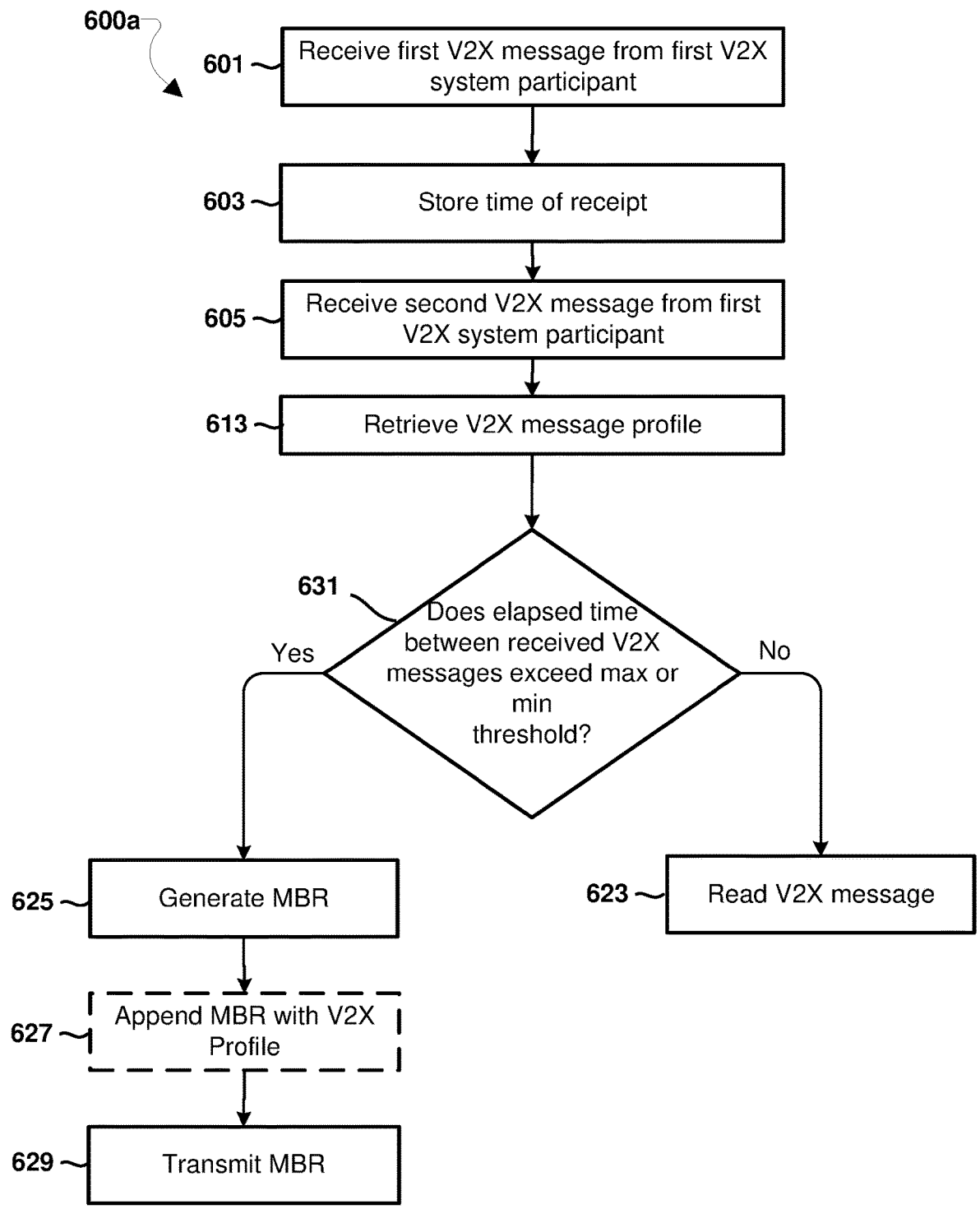
FIG. 6A is a process flow diagram illustrating operations of a method for detecting a misbehavior condition occurring during the receipt of a V2X message consistent with various embodiments disclosed herein.

FIG. 6A illustrates a simplified embodiment method 600$a$ that monitors received V2X messages to determine whether the received V2X message may indicate that a misbehavior condition may occur based on the frequency of V2X message receipt. With reference to FIGS. 1A-6A, the operations of the method 600$a$ may be performed by a V2X processing device in a V2X node (e.g., 200).

In block 601, a receiving second V2X system participant may receive a first V2X message may from a first V2X system participant.

In block 603, the V2X system processor of the receiving V2X system participant may store the time of receipt of the first V2X message from the first V2X system participant in memory.

In block 605, a second V2X message may be received from the first V2X system participant.

In block 613, the V2X system processor may retrieve a V2X message profile.

In determination block 631, the V2X system processor of the receiving second V2X system participant may determine whether the elapsed time between received V2X messages from the first V2X system participant exceeds a maximum or minimum time frequency threshold. The time frequency thresholds may be hard coded into the V2X system processor memory or may be contained in a geographic area retrieved V2X message profile.

In response to determining that the elapsed time between received V2X messages from the first V2X system participant exceeds a maximum or minimum time frequency threshold (i.e., determination block 631=Yes), the V2X system processor of the receiving second V2X system participant may determine that a misbehavior condition has occurred and similar to block 525 and 529 in FIGS. 5A and 5C) generate an MBR, block 625.

In some embodiments, the V2X processor may identify the detected misbehavior condition as a violation of the reception rules. In order to support the determination of the misbehavior condition as a violation of the generation rules, the V2X system processor may append the MBR with the V2X message profile in optional block 627.

In block 629, the V2X processor may transmit the MBR to the misbehavior management authority 74 directly, or indirectly through an OEM server 70, 72 in block 627. In response to determining that the elapsed time between received V2X messages from the first V2X system participant does not exceed a maximum or minimum time frequency threshold (i.e., determination block 631=No), the V2X system processor of the receiving second V2X system participant may read the V2X message, block 623 and update the status of the first V2X participant.

Figure 6B:
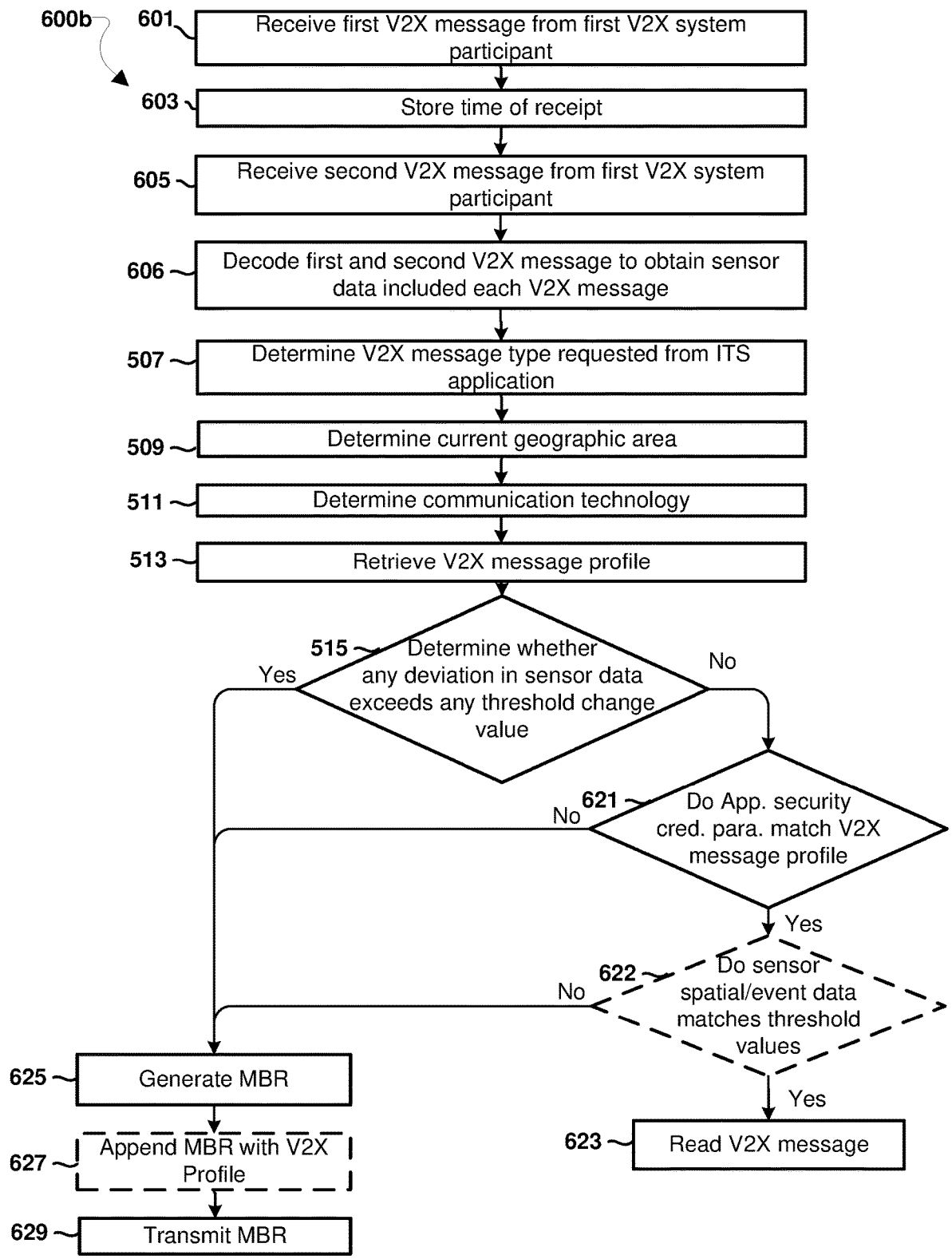
FIG. 6B is a process flow diagram illustrating operations of a method for detecting a misbehavior condition including security credential detection related to the receipt of a V2X message consistent with various embodiments disclosed herein.

FIG. 6B illustrates another embodiment method 600b that monitors received V2X messages to determine whether the received V2X message may indicate that a misbehavior condition may occur based on various deviation thresholds and appropriate security credential determinations similar to the monitoring and analysis that may occur on a generation/transmission V2X system processor described in FIG. 5C. With reference to FIGS. 1A-6B, the operations of the method 600b may be performed by a V2X processing device in a V2X node (e.g., 200).

In the method 600b, the V2X system processor of the receiving second V2X system participant may perform the operations of blocks 601, 603 and 605 of the method 600a as described.

In block 606, the V2X system processor of the receiving second V2X system participant may decode the first and second received V2X messages to obtain the sensor date included in each respective V2X message. Based on the obtained sensor data, the V2X system processor of the receiving second V2X system participant may calculate deviation values for each of the obtained sensor data.

In blocks 507, 509, 511, and 513, the V2X system processor of the receiving second V2X system participant may retrieve a V2X message profile appropriate for the geographic area, communication message type and/or communication technology in blocks 507-513 of the method 500a as described.

In determination block 515, the V2X system processor of the receiving second V2X system participant may determine whether any calculated deviation values from the received first and second V2X messages exceeds any threshold deviation values contained in the retrieved V2X message profile as described.

In response to the V2X processor of the receiving second V2X system participant determining that any of the calculated deviation values does exceed the respective threshold deviation values (i.e., determination block 515=Yes), the V2X processor of the receiving second V2X system participant may generate a misbehavior report (MBR) in block 625.

In some embodiments, the V2X processor of the receiving second V2X system participant may identify the detected misbehavior condition as a violation of the reception rules. In order to support the determination of the misbehavior condition as a violation of the reception rules, the V2X system processor may append the MBR with the V2X message profile in optional block 627.

In block 629 the V2X processor of the receiving second V2X system participant may transmit the MBR to the misbehavior management authority 74 directly, or indirectly through an OEM server 70, 72 in block 629 of the method 600a as described.

In response to the V2X processor of the receiving second V2X system participant determining that none of the calculated deviation values do not exceed any respective threshold deviation value (i.e., determination block 515=No), the V2X processor of the receiving second V2X system participant may determine whether the security credential parameters of the security credential applied to the received V2X message match the security credential parameters contained in the V2X message profile in determination block 621 similar to operations in determination block 521 of the method 500b as described.

In response to the V2X system processor of the receiving second V2X system participant determining that the applied security credential to the V2X message is appropriate (i.e., determination block 621=Yes), the V2X processor of the receiving second V2X system participant may determine whether the spatial/event data associated with the generation of the V2X message matches the spatial/event threshold data values contained in the V2X message profile in determination block 622 similar to operations in determination block 522 of the method 500b as described.

In response to the V2X system processor of the receiving second V2X system participant determining that the applied security credential to the V2X message is not appropriate (i.e., determination block 621=No), the V2X processor of the receiving second V2X system participant may generate a misbehavior report (MBR) in block 625 and transmit the MBR to the misbehavior management authority 74 directly, or indirectly through an OEM server 70, 72 in block 627.

In response to the V2X processor of the receiving second V2X system participant determining that the spatial/event data associated with the generation of the V2X message does not match the spatial/event threshold data values contained in the V2X message profile (i.e., determination block 622=No), the V2X processor of the receiving second V2X system participant may generate a misbehavior report (MBR) in block 625.

In response to the V2X processor of the receiving second V2X system participant determining that the spatial/event data associated with the generation of the V2X message matches the spatial/event threshold data values contained in the V2X message profile (i.e., determination block 622=Yes), the V2X processor of the receiving second V2X system participant may read the V2X message in block 623 and update the status of the first V2X system participant.

Figure 7:
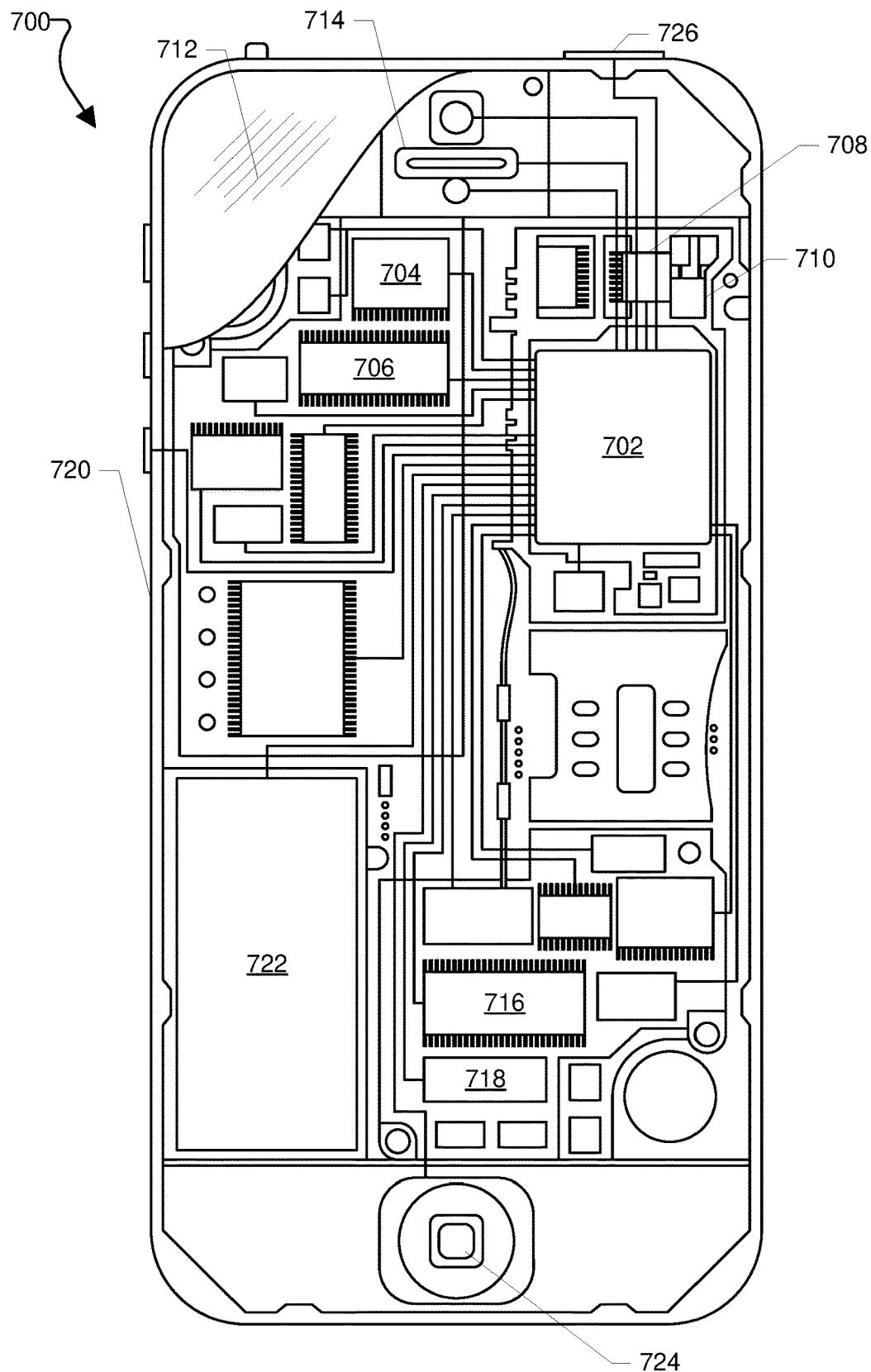
FIG. 7 is a component block diagram illustrating an example mobile computing device suitable for use with Various embodiments.

Various embodiments (including, but not limited to, embodiments described above with reference to FIGS. 1A-6B) may be implemented in a wide variety of computing systems including on-board equipment as well as mobile computing devices, an example of which suitable for use with Various embodiments is illustrated in FIG. 7. With reference to FIGS. 1A-7, a mobile computing device 700 may include a processor 702 coupled to a touchscreen controller 704 and an internal memory 706. The processor 702 may be one or more multicore integrated circuits designated for general or specific processing tasks. The internal memory 706 may be volatile or non-volatile memory, and may also be secure and/or encrypted memory, or unsecure and/or unencrypted memory, or any combination thereof. Examples of memory types that can be leveraged include but are not limited to DDR, LPDDR, GDDR, WIDEIO, RAM, SRAM, DRAM, P-RAM, R-RAM, M-RAM, STT-RAM, and embedded DRAM. The touchscreen controller 704 and the processor 702 may also be coupled to a touchscreen panel 712, such as a resistive-sensing touchscreen, capacitive-sensing touchscreen, infrared sensing touchscreen, etc. Additionally, the display of the mobile computing device 700 need not have touch screen capability.

The mobile computing device 700 may have one or more radio signal transceivers 708 (e.g., Peanut, Bluetooth, Zig-Bee, Wi-Fi, RF radio) and antennae 710, for sending and receiving communications, coupled to each other and/or to the processor 702. The transceivers 708 and antennae 710 may be used with the above-mentioned circuitry to implement the various wireless transmission protocol stacks and interfaces. The mobile computing device 700 may include a cellular network wireless modem chip 716 that enables communication via a cellular network and is coupled to the processor.

The mobile computing device 700 may include a peripheral device connection interface 718 coupled to the processor 702. The peripheral device connection interface 718 may be singularly configured to accept one type of connection, or may be configured to accept various types of physical and communication connections, common or proprietary, such as Universal Serial Bus (USB), FireWire, Thunderbolt, or PCIe. The peripheral device connection interface 718 may also be coupled to a similarly configured peripheral device connection port (not shown).

The mobile computing device 700 may also include speakers 714 for providing audio outputs. The mobile computing device 700 may also include a housing 720, constructed of a plastic, metal, or a combination of materials, for containing all or some of the components described herein. One of ordinary skill in the art may recognize that the housing 720 may be a dashboard console of a vehicle in an on-board embodiment. The mobile computing device 700 may include a power source 722 coupled to the processor 702, such as a disposable or rechargeable battery. The rechargeable battery may also be coupled to the peripheral device connection port to receive a charging current from a source external to the mobile computing device 700. The mobile computing device 700 may also include a physical button 724 for receiving user inputs. The mobile computing device 700 may also include a power button 726 for turning the mobile computing device 700 on and off.

Figure 8:
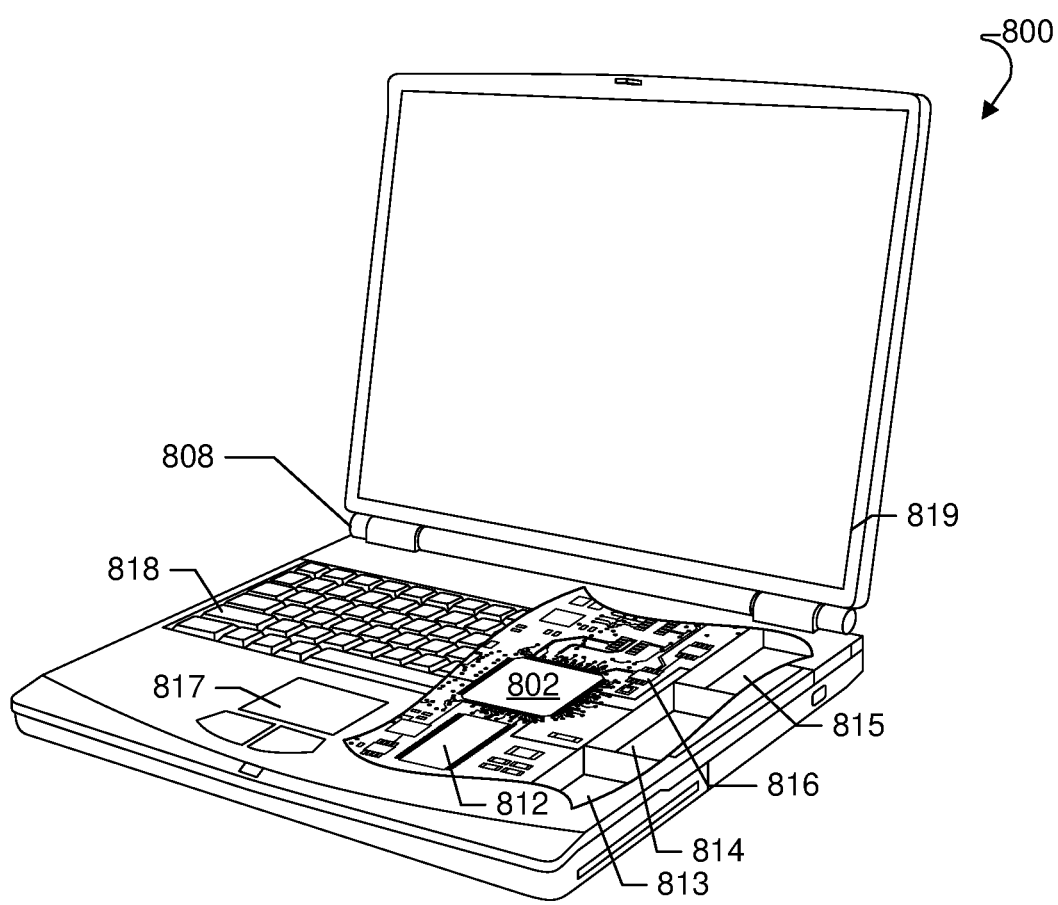
FIG. 8 is a component block diagram illustrating an example mobile computing device suitable for use with Various embodiments.

Various embodiments (including, but not limited to, embodiments described above with reference to FIGS. 1A-6B) may be implemented in a wide variety of computing systems include a laptop computer 800 an example of which is illustrated in FIG. 8. Many laptop computers include a touchpad touch surface 817 that serves as the computer's pointing device, and thus may receive drag, scroll, and flick gestures similar to those implemented on computing devices equipped with a touch screen display and described above. A laptop computer 800 will typically include a processor 802 coupled to volatile memory 812 and a large capacity nonvolatile memory, such as a disk drive 813 of Flash memory. Additionally, the computer 800 may have one or more antenna 808 for sending and receiving electromagnetic radiation that may be connected to a wireless data link and/or cellular telephone transceiver 816 coupled to the processor 802. The computer 800 may also include a floppy disc drive 814 and a compact disc (CD) drive 815 coupled to the processor 802. In a notebook configuration, the computer housing includes the touchpad 817, the keyboard 818, and the display 819 all coupled to the processor 802. Other configurations of the computing device may include a computer mouse or trackball coupled to the processor (e.g., via a USB input) as are well known, which may also be used in conjunction with Various embodiments.

Figure 9:
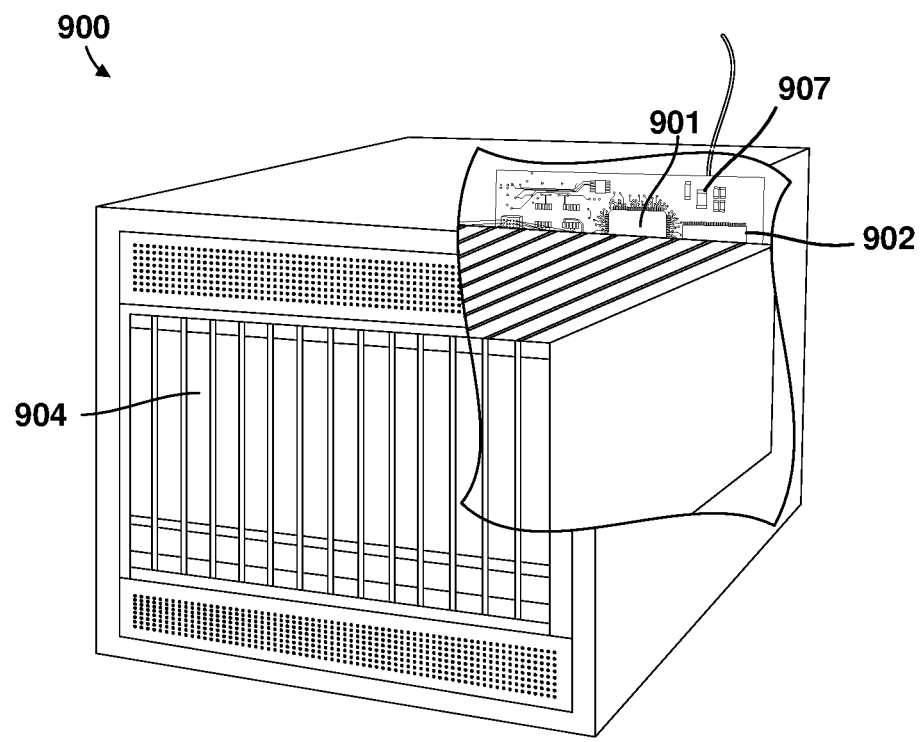
FIG. 9 is a component block diagram illustrating an example server suitable for use with Various embodiments.

The various embodiments (including, but not limited to, embodiments described above with reference to FIGS. 1A-6B) may by a variety of vehicle computing system, an example of which is illustrated in FIG. 9. A vehicle computing system 900 typically includes one or more multicore processor assemblies 901 coupled to volatile memory 902 and a large capacity nonvolatile memory, such as a disk drive 904. As illustrated in FIG. 9, multicore processor assemblies 901 may be added to the vehicle computing system 900 by inserting them into the racks of the assembly. The vehicle computing system 900 may also include communication ports 907 coupled to the multicore processor assemblies 901 for exchanging data and commands with a radio module (not shown), such as a local area network coupled to other broadcast system computers and servers, the Internet, the public switched telephone network, and/or a cellular data network (e.g., CDMA, TDMA, GSM, PCS, 3G, 4G, 5G, LTE, or any other type of cellular data network).

A number of different cellular and mobile communication services and standards are available or contemplated in the future, all of which may implement and benefit from Various embodiments. Such services and standards include, e.g., third generation partnership project (3GPP), long term evolution (LTE) systems, third generation wireless mobile communication technology (3G), fourth generation wireless mobile communication technology (4G), fifth generation wireless mobile communication technology (5G), global system for mobile communications (GSM), universal mobile telecommunications system (UMTS), 3GSM, general packet radio service (GPRS), code division multiple access (CDMA) systems (e.g., cdmaOne, CDMA1020™), enhanced data rates for GSM evolution (EDGE), advanced mobile phone system (AMPS), digital AMPS (IS-136/TDMA), evolution-data optimized (EV-DO), digital enhanced cordless telecommunications (DECT), Worldwide Interoperability for Microwave Access (WiMAX), wireless local area network (WLAN), Wi-Fi Protected Access I & II (WPA, WPA2), and integrated digital enhanced network (iDEN). Each of these technologies involves, for example, the transmission and reception of voice, data, signaling, and/or content messages. It should be understood that any references to terminology and/or technical details related to an individual telecommunication standard or technology are for illustrative purposes only, and are not intended to limit the scope of the claims to a particular communication system or technology unless specifically recited in the claim language.

Implementation examples are described in the following paragraphs. While some of the following implementation examples are described in terms of example methods, further example implementations may include: the example methods discussed in the following paragraphs implemented by a V2X system processor that may be an onboard unit, mobile device unit, mobile computing unit, or stationary roadside unit including a processor configured with processor-executable instructions to perform operations of the methods of the following implementation examples; the example methods discussed in the following paragraphs implemented by a V2X system including means for performing functions of the methods of the following implementation examples; and the example methods discussed in the following paragraphs may be implemented as a non-transitory processor-readable storage medium having stored thereon processor-executable instructions configured to cause a V2X system processor to perform the operations of the methods of the following implementation examples.

Example 1. A method of detecting a misbehavior condition in a vehicle-to-everything (V2X) system, including: retrieving a V2X message profile including a threshold deviation value for sensor data; comparing current sensor data to sensor data contained in a previous vehicle-to-everything (V2X) message to calculate a deviation value for each of the sensor data; determining whether the deviation value for each of the sensor data from the sensor data contained in a previous V2X message exceeds a threshold deviation value contained in the V2X message profile; and generating and transmitting a V2X message including the current sensor data in response to determining that the deviation value for each of the sensor data from the sensor data contained in a previous V2X message does not exceed a threshold deviation value for each of the sensor data.

Example 2. The method of example 1, further including: generating and transmitting a misbehavior report to a misbehavior managing authority in response to determining that the deviation value in the sensor data from the sensor data contained in a previous V2X message exceed a threshold deviation value.

Example 3. The method of example 2, further including: identifying the misbehavior condition in the misbehavior report as a generation violation; and appending the misbehavior report with the V2X message profile or an index of a pre-agreed V2X message profile.

Example 4. The method of any of examples 1-3, further including: applying a security credential to the generated V2X message; determining whether the applied security credential is appropriate for the V2X message; transmitting the V2X message to another V2X system participant in response to determining that the applied security credential is appropriate; and generating and transmitting a misbehavior report in response to determining that the parameters of the applied security credential do not match security credential parameters contained in the V2X message profile.

Example 5. The method of any of examples 1-4, further including: determining a type of the V2X message to be generated, in which retrieving a V2X message profile includes retrieving the V2X message profile based on the determined V2X message type.

Example 6. The method of any of examples 1-5, further including: determining a current geographic area; such that retrieving the V2X message profile may include the operations of retrieving the V2X message profile based on the determined current geographic area, and in which the security credential parameters contained in the V2X message profile may include: a signature algorithm; signature algorithm parameters; an encryption algorithm; encryption algorithm parameters; a security credential certificate type; a full security credential certificate attach rate; security credential header fields; security credential header checks; and a pseudonym change strategy; and determining that parameters of the applied security credential match security credential parameters contained in the V2X message profile in response to determining that at least one of the security credential parameters of the applied security credential type matches the security credential parameters contained in the V2X message profile.

Example 7. The method of any of examples 1-6, further including: determining a communication technology that V2X system participants are using to transmit and receive V2X messages, in which the threshold deviation values contained in the V2X message profile are based on the determined communication technology.

Example 8. The method of any of examples 1-7, in which the V2X message may be a co-operative awareness message (CAM), and the V2X message profile may include: a threshold for a maximum frequency of CAM message; a threshold for a minimum frequency of CAM message a deviation in heading threshold; a deviation in position threshold; and a deviation in velocity threshold.

Example 9. The method of any of examples 1-8, in which the security credential certificate type may be one of an authentication certificate digest, an authentication full certificate, or an authentication chain.

Example 10. The method of any of examples 1-9, further including: determining whether current sensor spatial data values match threshold spatial data values contained in the V2X message profile such that generating and transmitting the V2X message including the current sensor data in response to determining that the deviation value for each of the sensor data from the sensor data contained in a previous V2X message does not exceed a threshold deviation value for each of the sensor data further includes generating and transmitting the V2X message in response to determining that the current sensor spatial data values match threshold spatial data values contained in the V2X message profile.

Example 11. The method of any of examples 1-9, further including: determining whether current sensor event data values match threshold event data values contained in the V2X message profile such that generating and transmitting the V2X message including the current sensor data in response to determining that the deviation value for each of the sensor data from the sensor data contained in a previous V2X message does not exceed a threshold deviation value for each of the sensor data further includes generating and transmitting the V2X message in response to determining that the current sensor event data values match threshold event data values contained in the V2X message profile.

Example 12. A method of detecting a misbehavior condition in a vehicle-to-everything (V2X) system, including: retrieving a V2X message profile including a threshold deviation value for sensor data; receiving a first V2X message from another V2X system participant; storing a time of receipt of the first V2X message, receiving a second V2X message from the other V2X system participant; determining whether an elapsed time between a time of receipt of the second V2X message and the time of receipt of the first V2X message exceeds a threshold time value contained in the V2X message profile; and transmitting a misbehavior report to a misbehavior managing authority in response to determining that the elapsed time between the time of receipt of the second V2X message and the time of receipt of the first V2X message exceeds the threshold time value.

Example 13. The method of example 12, further including: comparing sensor data contained in each of the first V2X message and the second V2X message to determine whether there has been a deviation in sensor data that exceeds a threshold deviation value contained in the V2X message profile; and transmitting a misbehavior report to the misbehavior managing authority in response to determining that the deviation in the sensor data exceeds a threshold deviation value.

Example 14. The method of either of examples 12 or 13, further including: identifying the misbehavior condition in the misbehavior report as a reception violation and appending the misbehavior report with a V2X message profile.

Example 15. The method of any of examples 12-14, further including: obtaining an applied security credential included in the first V2X message if present; obtaining an applied security credential included in the second V2X message if present, determining whether parameters of the applied security credential match security credential parameters contained in the V2X message profile; generating and transmitting the misbehavior report in response to determining that the parameters of the applied security credential do not match security credential parameters contained in the V2X message profile.

Example 16. The method of any of examples 12-15, further including: determining a V2X message type of the first and second V2X messages; and retrieving a V2X message profile including the threshold time value based on the determined message type.

Example 17. The method of any of examples 12-16, further including: determining a current geographic area, in which the V2X message profile is retrieved based on the determined geographic area and in which the security credential parameters contained in the V2X message profile may include: a signature algorithm; signature algorithm parameters; an encryption algorithm; encryption algorithm parameters; a security credential certificate type; a full security credential certificate attach rate; security credential header fields; security credential header checks; and a pseudonym change strategy; and determining that parameters of the applied security credential match security credential parameters contained in the V2X message profile in response to determining that at least one of the security credential parameters of the applied security credential type matches the security credential parameters contained in the V2X message profile.

Various embodiments illustrated and described are provided merely as examples to illustrate various features of the claims. However, features shown and described with respect to any given embodiment are not necessarily limited to the associated embodiment and may be used or combined with other embodiments that are shown and described. Further, the claims are not intended to be limited by any one example embodiment.

The foregoing method descriptions and the process flow diagrams are provided merely as illustrative examples and are not intended to require or imply that the operations of various embodiments must be performed in the order presented. As will be appreciated by one of skill in the art the order of operations in the foregoing embodiments may be performed in any order. Words such as "thereafter," "then," "next," etc. are not intended to limit the order of the operations; these words are used to guide the reader through the description of the methods. Further, any reference to claim elements in the singular, for example, using the articles "a," "an," or "the" is not to be construed as limiting the element to the singular.

Various illustrative logical blocks, modules, components, circuits, and algorithm operations described in connection with the embodiments disclosed herein may be implemented as electronic hardware, computer software, or combinations of both. To clearly illustrate this interchangeability of hardware and software, various illustrative components, blocks, modules, circuits, and operations have been described above generally in terms of their functionality. Whether such functionality is implemented as hardware or software depends upon the particular application and design constraints imposed on the overall system. Skilled artisans may implement the described functionality in varying ways for each particular application, but such embodiment decisions should not be interpreted as causing a departure from the scope of the claims.

The hardware used to implement various illustrative logics, logical blocks, modules, and circuits described in connection with the embodiments disclosed herein may be implemented or performed with a general purpose processor, a digital signal processor (DSP), an application specific integrated circuit (ASIC), a field programmable gate array (FPGA) or other programmable logic device, discrete gate or transistor logic, discrete hardware components, or any combination thereof designed to perform the functions described herein. A general-purpose processor may be a microprocessor, but, in the alternative, the processor may be any conventional processor, controller, microcontroller, or state machine. A processor may also be implemented as a combination of receiver smart objects, e.g., a combination of a DSP and a microprocessor, a plurality of microprocessors, one or more microprocessors in conjunction with a DSP core, or any other such configuration. Alternatively, some operations or methods may be performed by circuitry that is specific to a given function.

In one or more embodiments, the functions described may be implemented in hardware, software, firmware, or any combination thereof. If implemented in software, the functions may be stored as one or more instructions or code on a non-transitory computer-readable storage medium or non-transitory processor-readable storage medium. The operations of a method or algorithm disclosed herein may be embodied in a processor-executable software module or processor-executable instructions, which may reside on a non-transitory computer-readable or processor-readable storage medium. Non-transitory computer-readable or processor-readable storage media may be any storage media that may be accessed by a computer or a processor. By way of example but not limitation, such non-transitory computer-readable or processor-readable storage media may include RAM, ROM, EEPROM, FLASH memory, CD-ROM or other optical disk storage, magnetic disk storage or other magnetic storage smart objects, or any other medium that may be used to store desired program code in the form of instructions or data structures and that may be accessed by a computer. Disk and disc, as used herein, includes compact disc (CD), laser disc, optical disc, digital versatile disc (DVD), floppy disk, and Blu-ray disc where disks usually reproduce data magnetically, while discs reproduce data optically with lasers. Combinations of the above are also included within the scope of non-transitory computer-readable and processor-readable media. Additionally, the operations of a method or algorithm may reside as one or any combination or set of codes and/or instructions on a non-transitory processor-readable storage medium and/or computer-readable storage medium, which may be incorporated into a computer program product.

The preceding description of the disclosed embodiments is provided to enable any person skilled in the art to make or use the claims. Various modifications to these embodiments will be readily apparent to those skilled in the art, and the generic principles defined herein may be applied to other embodiments without departing from the scope of the claims. Thus, the present disclosure is not intended to be limited to the embodiments shown herein but is to be accorded the widest scope consistent with the following claims and the principles and novel features disclosed herein.

What is claimed is:

1. A method of detecting a misbehavior condition by a vehicle-to-everything (V2X) system participant, comprising:

retrieving a V2X message profile including a threshold deviation value for sensor data;
receiving a first V2X message from another V2X system participant;
storing a time of receipt of the first V2X message;
receiving a second V2X message from the other V2X system participant;

determining whether an elapsed time between a time of receipt of the second V2X message and the time of receipt of the first V2X message exceeds a threshold time value contained in the V2X message profile; and transmitting a misbehavior report to a misbehavior managing authority in response to determining that the elapsed time between the time of receipt of the second V2X message and the time of receipt of the first V2X message exceeds the threshold time value.

2. The method of claim 1, further comprising:

comparing sensor data contained in each of the first V2X message and the second V2X message to determine whether there has been a deviation in sensor data that exceeds a threshold deviation value contained in the V2X message profile; and transmitting a misbehavior report to the misbehavior managing authority in response to determining that the deviation in the sensor data exceeds a threshold deviation value contained in the V2X message profile.

3. The method of claim 2, further comprising:

identifying a misbehavior condition in the misbehavior report as a reception violation; and appending the misbehavior report with the V2X message profile or an index of a pre-agreed V2X message profile.

4. The method of claim 2, further comprising:

obtaining an applied security credential included in the first V2X message if present;

obtaining an applied security credential included in the second V2X message if present;

determining whether security credential parameters of the applied security credential match security credential parameters contained in the V2X message profile; and generating and transmitting the misbehavior report in response to determining that the security credential parameters of the applied security credential do not match security credential parameters contained in the V2X message profile.

5. The method of claim 4, further comprising:

determining one or both of a current geographic area or a V2X message type of the first V2X message and the second V2X message, wherein retrieving the V2X message profile comprises retrieving the V2X message profile based on one or both of the determined current geographic area or the determined message type, and wherein the security credential parameters contained in the V2X message profile comprises:

a signature algorithm;

signature algorithm parameters;

an encryption algorithm;

encryption algorithm parameters;

a security credential certificate type;

a full security credential certificate attach rate;

security credential header fields;

security credential header checks; and a pseudonym change strategy; and determining that security credential parameters of the applied security credential match security credential parameters contained in the V2X message profile in response to determining that at least one of the security credential parameters of the applied security credential type matches the security credential parameters contained in the V2X message profile.

6. The method of claim 5, wherein the V2X message profile includes a maximum frequency of messages threshold, a minimum frequency of messages threshold, a deviation in heading threshold, a deviation in position threshold, and a deviation in velocity threshold.

7. The method of claim 2, further comprising:

determining whether current sensor spatial data values or threshold event data values contained in either the received first V2X message or the received second V2X message match threshold spatial data values or threshold event data values contained in the V2X message profile; and transmitting the misbehavior report to the misbehavior managing authority in response to determining that the current sensor spatial data values or threshold event data values contained in either the received first V2X message or the received second V2X message do not match threshold spatial data values or threshold event data values contained in the V2X message profile.

8. A vehicle-to-everything (V2X) equipment, comprising:

a transmitter configured to wirelessly transmit and receive V2X messages and misbehavior reports; and a processor coupled to the transmitter, wherein the processor is configured with processor-executable instructions to:

retrieve a V2X message profile including a threshold deviation value for sensor data;

receive a first V2X message from another V2X system participant;

store a time of receipt of the first V2X message;

receive a second V2X message from the other V2X system participant;

determine whether an elapsed time between a time of receipt of the second V2X message and the time of receipt of the first V2X message exceeds a threshold time value contained in the V2X message profile; and transmit a misbehavior report to a misbehavior managing authority in response to determining that the elapsed time between the time of receipt of the second V2X message and the time of receipt of the first V2X message exceeds the threshold time value contained in the V2X message profile.

9. The V2X equipment of claim 8, wherein the processor is further configured with processor-executable instructions to:

compare sensor data contained in each of the first V2X message and the second V2X message to determine whether there has been a deviation in sensor data that exceeds a threshold deviation value contained in the V2X message profile; and transmit a misbehavior report to the misbehavior managing authority in response to determining that the deviation in the sensor data exceeds a threshold deviation value.

10. The V2X equipment of claim 9, wherein the processor is further configured with processor-executable instructions to:

identify a misbehavior condition in the misbehavior report as a reception violation; and append the misbehavior report with the V2X message profile or an index of a pre-agreed V2X message profile.

11. The V2X equipment of claim 9, wherein the processor is further configured with processor-executable instructions to:

obtain an applied security credential included in the first V2X message if present;

obtain an applied security credential included in the second V2X message if present;

determine whether security credential parameters of the applied security credential match security credential parameters contained in the V2X message profile; and
generate and transmit the misbehavior report in response to determining that the security credential parameters of the applied security credential do not match security credential parameters contained in the V2X message profile.

12. The V2X equipment of claim 11, wherein the processor is further configured with processor-executable instructions to:
determine one or both of a current geographic area or a V2X message type of the first V2X message and the second V2X message,
wherein the processor is further configured with processor-executable instructions to retrieve the V2X message profile by retrieving the V2X message profile based on one or both of the determined current geographic area or the determined message type, and
wherein the security credential parameters contained in the V2X message profile comprises:
a signature algorithm;
signature algorithm parameters;
an encryption algorithm;
encryption algorithm parameters;
a security credential certificate type;
a full security credential certificate attach rate;
security credential header fields;
security credential header checks; and
a pseudonym change strategy; and
determine that parameters of the applied security credential match security credential parameters contained in the V2X message profile in response to determining that at least one of the security credential parameters of the applied security credential type matches the security credential parameters contained in the V2X message profile.

13. The V2X equipment of claim 12, wherein the processor is further configured with processor-executable instructions to:
determine a communication technology that V2X system participants are using to transmit and receive V2X messages, wherein the threshold time value, the threshold deviation value and security profile contained in the V2X message profile are based on the determined communication technology.

14. The V2X equipment of claim 12, wherein the V2X message profile includes a maximum frequency of messages threshold, a minimum frequency of messages threshold, a deviation in heading threshold, a deviation in position threshold, and a deviation in velocity threshold.

15. The V2X equipment of claim 9, wherein the processor is further configured with processor-executable instructions to:
determine whether current sensor spatial data values or threshold event data values contained in either the received first V2X message or the received second V2X message match threshold spatial data values or threshold event data values contained in the V2X message profile; and
transmit the misbehavior report to the misbehavior managing authority in response to determining that the current sensor spatial data values or threshold event data values contained in either the received first V2X message or the received second V2X message do not match threshold spatial data values or threshold event data values contained in the V2X message profile.

16. A vehicle-to-everything (V2X) equipment, comprising:
means for retrieving a vehicle-to-everything (V2X) message profile including a threshold deviation value for sensor data;
means for receiving a first V2X message from another V2X system participant;
means for storing a time of receipt of the first V2X message;
means for receiving a second V2X message from the other V2X system participant;
means for determining whether an elapsed time between a time of receipt of the second V2X message and the time of receipt of the first V2X message exceeds a threshold time value contained in the V2X message profile; and
means for transmitting a misbehavior report to a misbehavior managing authority in response to determining that the elapsed time between the time of receipt of the second V2X message and the time of receipt of the first V2X message exceeds the threshold time value.

17. The V2X equipment of claim 16, further comprising:
means for comparing sensor data contained in each of the first V2X message and the second V2X message to determine whether there has been a deviation in sensor data that exceeds a threshold deviation value contained in the V2X message profile; and
means for transmitting a misbehavior report to the misbehavior managing authority in response to determining that the deviation in the sensor data exceeds a threshold deviation value contained in the V2X message profile.

18. The V2X equipment of claim 17, further comprising:
means for identifying a misbehavior condition in the misbehavior report as a reception violation; and
means for appending the misbehavior report with the V2X message profile or an index of a pre-agreed V2X message profile.

19. The V2X equipment of claim 17, further comprising:
means for obtaining an applied security credential included in the first V2X message if present;
means for obtaining an applied security credential included in the second V2X message if present;
means for determining whether security credential parameters of the applied security credential match security credential parameters contained in the V2X message profile; and
means for generating and transmitting the misbehavior report in response to determining that the security credential parameters of the applied security credential do not match security credential parameters contained in the V2X message profile.

20. The V2X equipment of claim 17, further comprising:
means for determining whether current sensor spatial data values or threshold event data values contained in either the received first V2X message or the received second V2X message match threshold spatial data values or threshold event data values contained in the V2X message profile; and
means for transmitting the misbehavior report to the misbehavior managing authority in response to determining that the current sensor spatial data values or threshold event data values contained in either the received first V2X message or the received second V2X message do not match threshold spatial data values or threshold event data values contained in the V2X message profile.

\* \* \* \* \*